(12) United States Patent
Rivard et al.

(10) Patent No.: US 10,088,989 B2
(45) Date of Patent: Oct. 2, 2018

(54) SYSTEM AND METHOD FOR COMPUTING OPERATIONS BASED ON A FIRST AND SECOND USER INPUT

(71) Applicant: Duelight LLC, Sunnyvale, CA (US)

(72) Inventors: William Rivard, Menlo Park, CA (US); Adam Feder, Mountain View, CA (US); Brian Kindle, Sunnyvale, CA (US)

(73) Assignee: Duelight LLC, Sunnyvale, CA (US)

( * ) Notice: Subject to any disclaimer, the term of this patent is extended or adjusted under 35 U.S.C. 154(b) by 320 days.

(21) Appl. No.: 14/547,077

(22) Filed: Nov. 18, 2014

(65) Prior Publication Data
US 2016/0139774 A1 May 19, 2016

(51) Int. Cl.
| G06F 3/0484 | (2013.01) |
| G06F 3/041 | (2006.01) |
| G06F 3/0488 | (2013.01) |
| H04N 5/232 | (2006.01) |
| H04N 5/235 | (2006.01) |

(52) U.S. Cl.
CPC ...... *G06F 3/04842* (2013.01); *G06F 3/04845* (2013.01); *G06F 3/04883* (2013.01); *H04N 5/2354* (2013.01); *H04N 5/2355* (2013.01); *H04N 5/23216* (2013.01); *G06F 2203/04104* (2013.01)

(58) Field of Classification Search
CPC ......... G06F 2203/04104; G06F 3/0416; G06F 3/04842; G06F 3/04845; G06F 3/04883
See application file for complete search history.

(56) References Cited
U.S. PATENT DOCUMENTS

| 9,560,269 B2 | 1/2017 | Baldwin | |
| 2004/0021701 A1* | 2/2004 | Iwema | G06F 3/0481 715/863 |
| 2010/0010986 A1* | 1/2010 | Icho | G06F 17/30058 707/E17.014 |
| 2013/0154978 A1* | 6/2013 | Kim | G06F 3/0483 345/173 |
| 2013/0235071 A1* | 9/2013 | Ubillos | G06F 3/0484 345/600 |
| 2013/0287265 A1* | 10/2013 | Nepomniachtchi | G06K 9/00442 382/115 |
| 2014/0306899 A1* | 10/2014 | Hicks | G06F 3/04883 345/173 |
| 2015/0249810 A1* | 9/2015 | Sasaki | H04N 9/643 345/589 |
| 2016/0062615 A1* | 3/2016 | Price | G06F 3/04845 715/779 |

(Continued)

*Primary Examiner* — Amy Ng
*Assistant Examiner* — Tan H Tran
(74) *Attorney, Agent, or Firm* — Zilka Kotab, PC

(57) ABSTRACT

A system, method, and computer program product are provided for computing operations based on a first and second user input. In use, a first user input in a first region of a graphical user interface is received. Next, while receiving the first user input, a second user input is received in connection with one or more portions of displayed content in a second region of the graphical user interface. Lastly, one or more operations are computed in connection with the one or more portions of the displayed content, based on the first input and the second input. Additional systems, methods, and computer program products are also presented.

22 Claims, 18 Drawing Sheets

(56) References Cited

U.S. PATENT DOCUMENTS

2016/0196042 A1* 7/2016 Laute ................ G06F 3/017
                                                        715/845
2016/0248968 A1    8/2016 Baldwin
2017/0048442 A1    2/2017 Cote et al.

* cited by examiner

SYSTEM AND METHOD FOR COMPUTING OPERATIONS BASED ON A FIRST AND SECOND USER INPUT

FIELD OF THE INVENTION

The present invention relates to computing operations, and more particularly to systems and methods for computing operations based on a first and second user input.

BACKGROUND

Traditional mobile computing systems are limited by the number of ways in which a user can input operations. One solution to such limitation is to receive input through use of a touchscreen interface. Such technology, however, can be cumbersome, time consuming, and require many steps of interactions with the screen before achieving the desired result. As such, there is thus a need for addressing these and/or other issues associated with the prior art.

SUMMARY

A system, method, and computer program product are provided for computing operations based on a first and second user input. In use, a first user input in a first region of a graphical user interface is received. Next, while receiving the first user input, a second user input is received in connection with one or more portions of displayed content in a second region of the graphical user interface. Lastly, one or more operations are computed in connection with the one or more portions of the displayed content, based on the first input and the second input. Additional systems, methods, and computer program products are also presented.

DETAILED DESCRIPTION

Figure 1:
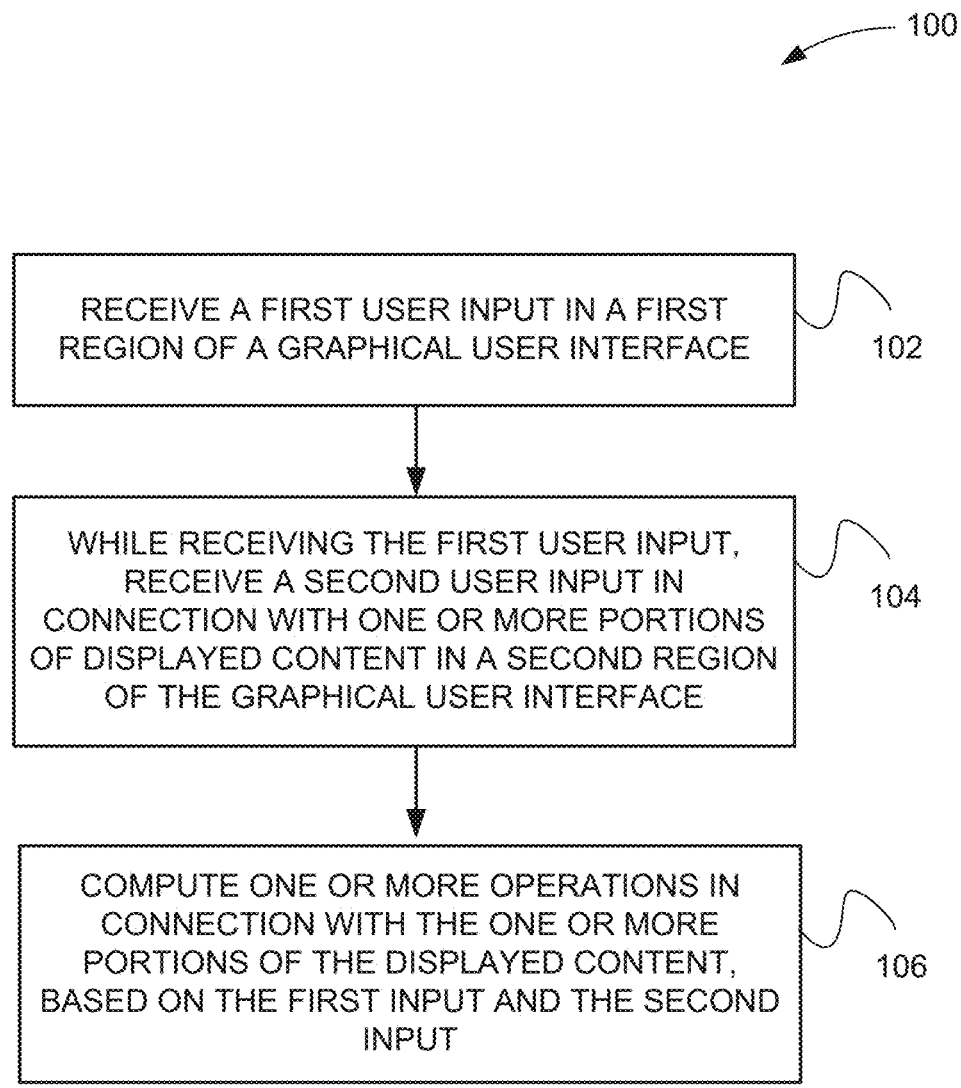
FIG. 1 illustrates a method for computing operations based on a first and second user input, in accordance with one possible embodiment.

FIG. 1 illustrates a method 100 for computing operations based on a first and second user input, in accordance with one possible embodiment. As an option, the method 100 may be carried out in the context of the details of any of the Figures. Of course, however, the method 100 may be carried out in any desired environment. Further, the aforementioned definitions may equally apply to the description below.

As shown, a first user input in a first region of a graphical user interface is received. See operation 102. Additionally, while receiving the first user input, a second user input in connection with one or more portions of displayed content in a second region of the graphical user interface is received. See operation 104. Lastly, one or more operations are computed in connection with the one or more portions of the displayed content, based on the first input and the second input. See operation 106.

In the context of the present description, a first region may include any area associated with a first user interface. A first user input may include any input received on the first region. Further, in the context of the present description, a second region may include any area associated with a second user interface. A second user input may include any input received on the second region.

In one embodiment, the first region may display one or more tools. Further, additional tools may be capable of being displayed in the first region through at least one of a region depth or layer, screens associated with the region, or window frames of the region. For example, in one embodiment, a z-layer for tools may be associated with the user interface wherein the user may scroll through multiple screens (e.g. showing tools, associated with tools, etc.) based on pressure, an action (e.g. scrolling, etc.), etc.

In another embodiment, a z-layer component may relate to manipulation of tools in a proximity to the screen. For example, in one embodiment, a device may sense how close a user's finger is to the screen, and based off of the distance, respond, including, but not limited to, displaying a selection, scrolling through more than one layers, and/or taking any other action in response to the user's actions.

In another embodiment, the second region of the graphical user interface may correspond with an image. In another embodiment, the second region of the graphical user interface may correspond with text.

Still yet, in one embodiment, the second user input may be capable of including one or more points. For example, in one embodiment, a user may select a first point and then select a second point. In another example, a user may indicate multiple points in the form of a swipe gesture. In one embodiment, the first and second points may be associated with the first user input (e.g. a tool which may be selected, etc.). In another embodiment, the one or more points may include at least one of a range of data, an average of data, and/or a specific location on the graphical user interface. In one embodiment, the range of data may include a range of attributes associated with the multiple points. For example, the range of data may comprise low and high intensity percentiles associated with a histogram of intensity attributes for the multiple points. In another example, an average of data may comprise an average of intensity values taken over the multiple points.

In a separate embodiment, the second user input may be capable of including two or more points, and each of the points may be associated with a specific one or more operations. Additionally, receiving the second user input may include receiving multiple points in connection with the one or more portions of the displayed content.

In one embodiment, one or more points may include a range of data, and the range of data may be based on one or more union regions. Further, in one embodiment, the second user input may be capable of including a union function between two or more points displayed in the second region.

Still yet, in one embodiment, an edge may be automatically detected in a region (e.g. second region, etc.). For example, in one embodiment, an edge may be detected based on a change in brightness, a detected discontinuity, and/or any other technique known in the art. Further, in another embodiment, the edge detection may be applied to each color channel (e.g. for each of the RGB channels, etc.), identified objects, identified closed regions, and the like.

In one embodiment, the second user input may be capable of including a contributing area for use in selecting a region based on one or more points of interest and an automatically detected edge or region. For example, in one embodiment, a user may select one or more points of interest, may provide a path of interest, and/or may select one or more areas of interest. Based on the selection, one or more edges associated with the selection may be detected, and a refined area (e.g. a contributing area, etc.) may be computed based on the one or more points of interest, the detected edges, detected regions, identified objects (e.g. part of a tree was selected but the entire tree was included in the refined area, etc.), etc.

Further, in a specific embodiment, in connection with the second user input, an edge may be automatically detected in the second region, an area of the second region may be selected, the selected area may be processed based on the automatically detected edge, at least one vector (e.g. an ordered list) for pixels selected may be created, and a resulting selected area may be displayed. In one embodiment, the one or more operations may include processing the at least one vector to display the resulting image based on the one or more operations.

Additionally, in the context of the present description, an operation may include any function or instruction relating to the portion of displayed content. For example, in one embodiment, the one or more operations may include using the range of pixels on the image. Additionally, the one or more operations may include using the range of pixels on the image, the range including histogram data In one embodiment, the first input and the second input may be associated with a touch and/or a gesture. For example, in one embodiment, a selection may be received via a screen or may be inputted via a hand or finger touch gesture. Of course, in other embodiments, any number of gestures (e.g. two touch, three touch, etc.) may be used to compute one or more operations. In other embodiments, an input may be received via an accelerometer, gyroscope, and/or any other sensor, in combination with the first input. For example, in one embodiment, while providing a first input by selecting a first tool, a user may provide a second input by selecting an object displayed on the screen, and after removing the second input but while still providing the first input, a third input may received via a gyroscope wherein the user may tilt the device in a specific direction (e.g. forward, etc.) which may allow the user to preview the results of the tool on the selection in real time. In such an embodiment, the user may finalize the results by removing the first input.

As an example, in one embodiment, a user may first select a tool. For example, a tool may include an ability to modify a black point, white point, median point, saturation, color value, contrast, exposure, equalization, intensity level mapping, etc. In another embodiment, a tool may include an ability to copy, cut, paste, look up (e.g. research the term online, etc.), define, show a synonym, show an antonym, check spelling, check grammar, perform a web search, perform a web image search, perform a web product search, etc. After selecting the appropriate tool, the user may then provide a second input by selecting a point, path, or area associated with a graphical user interface. After providing a second input, the tool may be applied to the selection. In a specific implementation, using a touch input screen, a user may touch a web search tool as a first input and swipe over text (e.g. within a document or web page) as a second input. Upon releasing their finger or fingers from the touch input screen, a web search may be initiated. In another specific implementation, using the touch input screen, a user may swipe over an image of a product they may wish to purchase to initiate a web product search.

In a specific embodiment, applying the tool to the selection may occur in real time. In other words, after receiving the second input, the selected tool (e.g. first input, etc.) may be applied in real time to that which was selected by the user in the second input.

In another embodiment, the first and second inputs may occur on a device with a large screen (e.g. a tablet, etc.). In this case, although one hand may be used with a smaller screen device (e.g. phone, etc.) to provide the first and second inputs, two hands may be used with a larger screen device. Of course, in other embodiments, the first and second inputs may be received in any manner and on any type of a device.

Further, in one embodiment, more than one input may be received associated with the selected tool. For example, a user may select a first second input selection and then select a separate second input selection, and both the first input selection and the second input selection may apply the tool that is selected. In another embodiment, a first second input selection may be associated with a first tool (e.g. first input, etc.) and a separate second input selection may be associated with a second tool (e.g. a second first input, etc.). In this manner, multiple points of interest may be associated with one or more selected tools.

Additionally, in one embodiment, the first input may be received in an area associated with one or more tools. The area may include a pallet or offering of tools, and in some embodiments, one or more pallets may be scrolled, rotated, and/or manipulated to be presented to the user. Additionally, in one embodiment, the area associated with the one or more tools may be located horizontally on the bottom of a screen, although in other embodiments, the one or more tools may be located anywhere. In one embodiment, the pallet of tools may be resized, repositioned, dragged, stretched, or otherwise reconfigured.

In another embodiment, the pallet may have multiple levels. For example, in one embodiment, selecting a tool may cause a second interface to be displayed in the area associated with the first input. If, in one embodiment, a color tool was selected, a second level and/or interface may include advanced settings such as ability to independently control the red, green, and blue color channels, for example for the purpose of saturation control. Of course, a second level and/or interface may be particular to the specific tool that was selected. In various embodiments, a tool (e.g. in the pallet, etc.) may be associated with a slider (e.g. in the second interface, etc.).

In one embodiment, a second input may be reconfigured. For example, a user may select a tool and then select an object (e.g. a tree in an image, etc.). However, the user may have incorrectly selected the object. As such, in one embodiment, the user may have the option of verifying the selection, redoing the selection, deleting the selection, backing up one or more levels of selection, and/or taking any other action to modifying the selection in some way.

Still yet, in a separate embodiment, once the second input is finished being received, the command associated with the feature (e.g. associated with a tool, etc.) may be performed. Additionally, in another embodiment, if the first input is disconnected before the second input is disconnected, then the command may not be performed. Further, if the second input is disconnected before the first input is deselected, the command may not be performed until the first input is disconnected (after the second input is disconnected, etc.). As such, in some embodiments, a specific order in which the inputs are received and disconnected, and the continuous receipt of the inputs, may be required in order for a command to be performed.

Still yet, in one embodiment, a user may select a first input, and may select a second input (e.g. a first tree, etc.) while continuously holding down the first input. Further, while still holding down the first input, the user may select a separate second input (e.g. a second tree, etc.). In such an embodiment, the first second input (e.g. first tree, etc.) and the separate second input (e.g. second tree, etc.) may both be selected. In this manner, multiple second inputs may be received at separate time intervals while the first input is continuously inputted.

Figure 2:
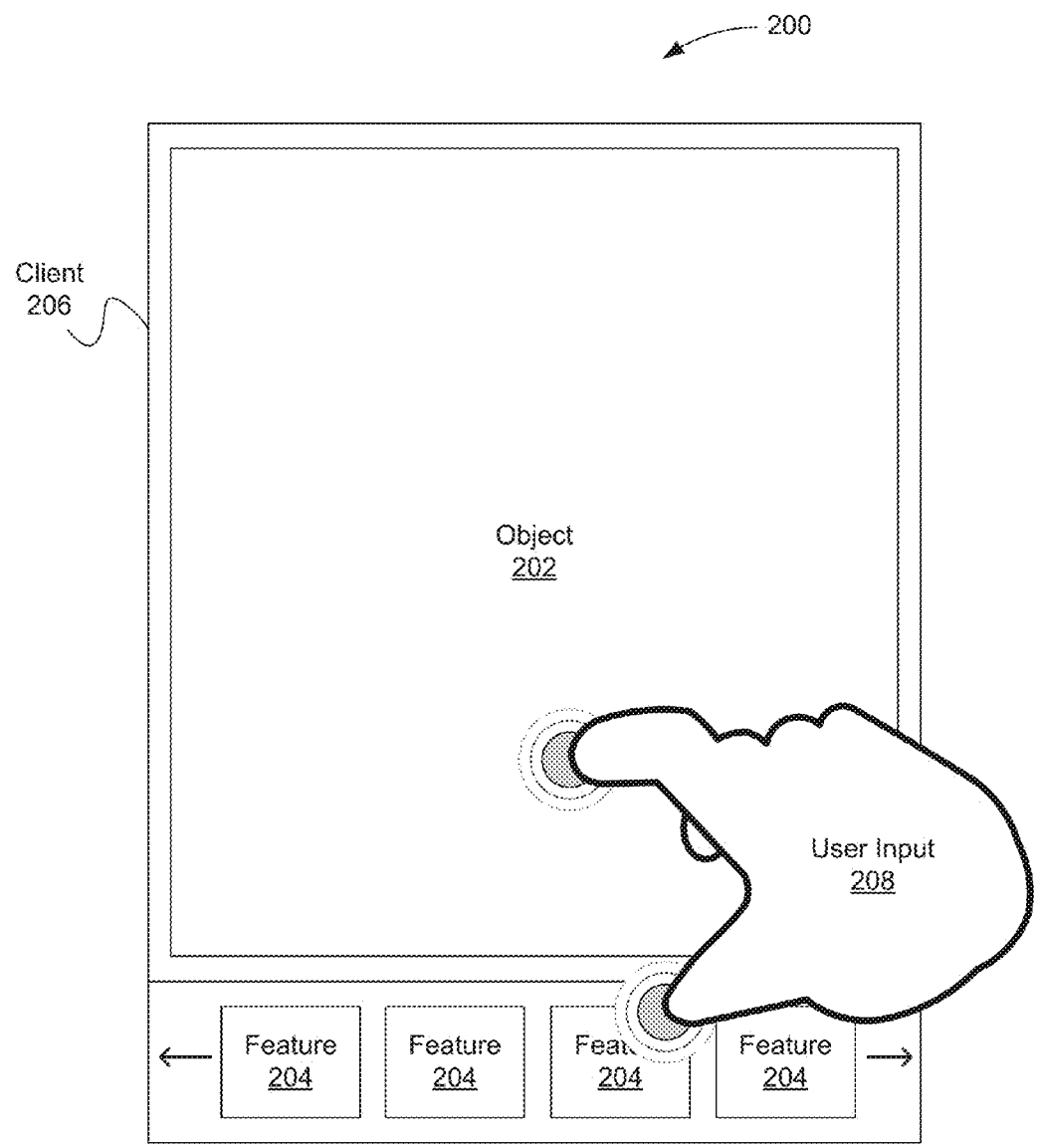
FIG. 2 illustrates a system for performing operations based on a first and second user input, in accordance with one embodiment.

FIG. 2 illustrates a system 200 carried out for operations based on a first and second user input, in accordance with one embodiment. As an option, the system 200 may be implemented in the context of the details of any of the Figures. Of course, however, the system 200 may be carried out in any desired environment. Further, the aforementioned definitions may equally apply to the description below.

As shown, system 200 includes a client device 206, an object 202, one or more features (e.g. tools) 204, and user input 208. In various embodiments, a client device may include a mobile device (e.g. phone, tablet, etc.) and/or any device with a touchscreen. In other embodiments, an object may include anything displayed on the client device screen, including, but not limited to, an image, text, video, etc.

Still yet, in one embodiment, one or more features 204 may include a tool. For example, a tool may include an ability to modify a black point, white point, median point, saturation, color value, contrast, exposure, etc. In another embodiment, a tool may include an ability to select, move, stretch, copy, cut, paste, search (e.g. research or search the term online, etc.), define, show a synonym, show an antonym, check spelling, check grammar, form an affiliation (e.g. between two or more items displayed within the object 202) etc.

Of course, in other embodiments, the one or more features 204 may be displayed in any manner, including, but not limited to, on a panel of features, the panel including multiple screens and/or displays which may be presented in response to a user action (e.g. swipe, scroll, etc.). In one embodiment, the feature may include one or more automatic settings. For example, in one embodiment, the feature may include a median point. The user may select a region, and the region may be used as a basis for determining the median intensity of an image comprising object 202, the determining of the median intensity initially occurring automatically. In one embodiment, the median point may be further configured and/or modified after being automatically determined. For example, after determining a median point, a user may refine the median point by configuring a slider on a histogram (e.g. sliding a median point to a separate value, etc.), using an eyedropper to more specifically define one or more median points. To this end, the user may select a region within the image that represents an area representative of a desired exposure appearance. Of course, however, the feature may be used for any parameter (e.g. white point, black point, metering, etc.).

In another embodiment, the feature may include an exposure adjustment. The user may select a region, and the region may be used as a basis for altering the exposure. For example, in one embodiment, more than one exposure associated with a capture may exist (e.g. an image stack), and altering the exposure may include blending the more than one exposures based on input from the user (e.g. via a slider, etc.). In such an embodiment, an alpha blend may occur between the multiple exposures based on the selected region. For example, the alpha blend may be performed in the selected region whereby the blend value for the alpha blend applies greater per pixel blend weight to pixels from one or more images having an intensity (or other pixel attribute) closest to a median intensity for the region, the whole image, or a combination thereof. In another embodiment, altering the exposure may include picking the exposure for the region. For example, an image may be associated with a first exposure, and a user may select a first selection (e.g. first tree, etc.). The user may then alter the exposure for the first selection by identifying and applying a different exposure (compared to the first exposure) for the first selection. In various embodiments, the first selection may be associated with a histogram, and the histogram may be updated based on the exposure selected for the first selection. In a further embodiment, even if a user selects a different exposure for the first selection, a blend (e.g. alpha blend, etc.) may be applied on the edges of the first selection.

In one embodiment, a histogram may be associated with an image, and such a histogram may be used to identify one or more inflection points (e.g. from dark weighted to light weighted, etc.). More than one exposure may be used to determine the best balance (e.g. between one exposure and a second exposure, etc.) and/or optimize the blending between the more than one exposure. Further, in a separate embodiment, an alpha blend may be used to determine the best balance between more than one exposure. For example, a first alpha blend and a second alpha blend may be used, and levels of granularity between the first alpha blend and the second alpha blend may be used to more precisely define the closest crossover point. In the context of the present description, a crossover point is where two pixel values are equal. In this manner, more than one exposure may be used to modify one or more selections within an image.

For example, in one embodiment, an image may include one or more objects inside of a house and one or more objects outside of a house in a different light. As indicated above, a user may select the objects inside the house and apply a flash exposure to the objects, and then select the one or more objects outside of the house and apply an ambient exposure. In some embodiments, multiple exposures may be associated with both a flash and ambient exposure, and the user may have the ability to control (e.g. via a slider, via a selection input, etc.) which of the exposures is to be applied to the selected one or more objects. Further, in one embodiment, the one or more objects may each be associated with a separate histogram, allowing the user to fine tune each of the applied exposures to the one or more objects. Additionally, as indicated herein, the user may have the option of blending two or more exposures, each of the exposures being selected by the user for the basis of the blending.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3A:
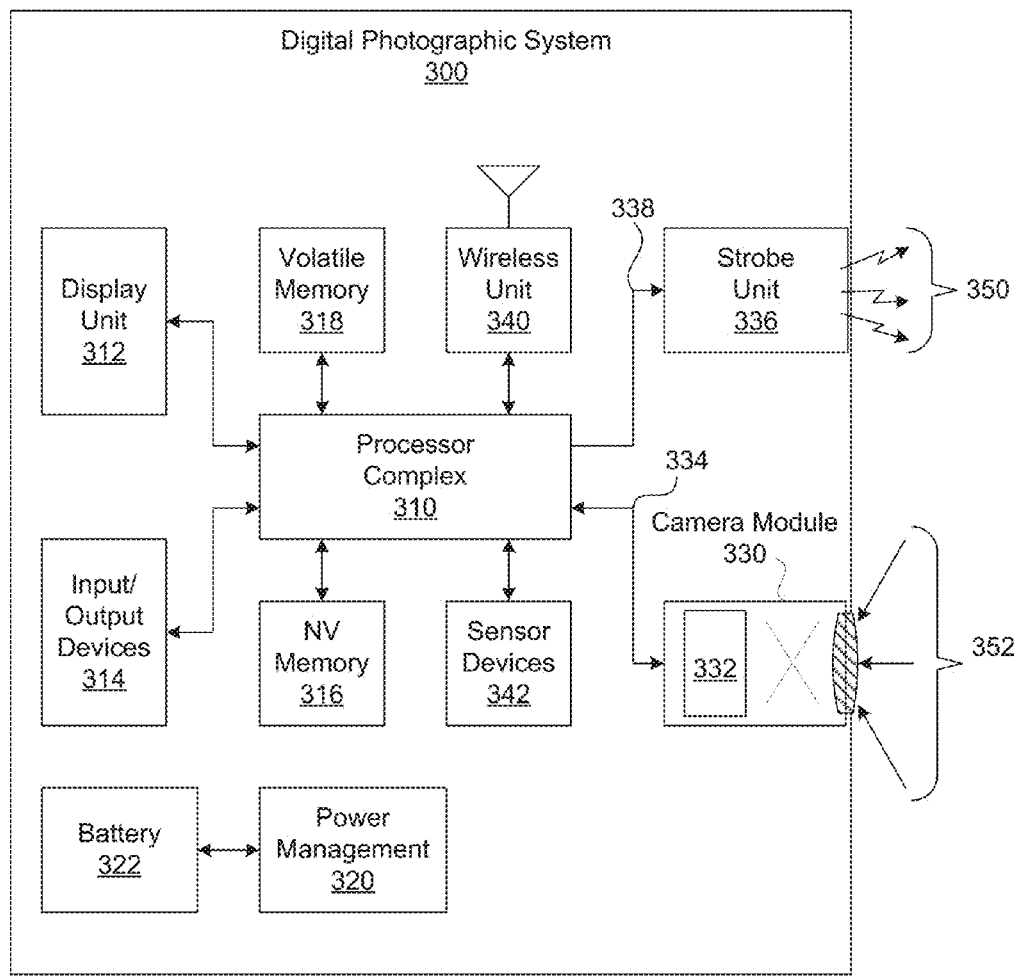
FIG. 3A illustrates a digital photographic system, in accordance with an embodiment.

FIG. 3A illustrates a digital photographic system 300, in accordance with one embodiment. As an option, the digital photographic system 300 may be implemented in the context of the details of any of the Figures disclosed herein. Of course, however, the digital photographic system 300 may be implemented in any desired environment. Further, the aforementioned definitions may equally apply to the description below.

As shown, the digital photographic system 300 may include a processor complex 310 coupled to a camera module 330 via an interconnect 334. In one embodiment, the processor complex 310 is coupled to a strobe unit 336. The digital photographic system 300 may also include, without limitation, a display unit 312, a set of input/output devices 314, non-volatile memory 316, volatile memory 318, a wireless unit 340, and sensor devices 342, each coupled to the processor complex 310. In one embodiment, a power management subsystem 320 is configured to generate appropriate power supply voltages for each electrical load element within the digital photographic system 300. A battery 322 may be configured to supply electrical energy to the power management subsystem 320. The battery 322 may implement any technically feasible energy storage system, including primary or rechargeable battery technologies. Of course, in other embodiments, additional or fewer features, units, devices, sensors, or subsystems may be included in the system.

In one embodiment, a strobe unit 336 may be integrated into the digital photographic system 300 and configured to provide strobe illumination 350 during an image sample event performed by the digital photographic system 300. In another embodiment, a strobe unit 336 may be implemented as an independent device from the digital photographic system 300 and configured to provide strobe illumination 350 during an image sample event performed by the digital photographic system 300. The strobe unit 336 may comprise one or more LED devices, a gas-discharge illuminator (e.g. a Xenon strobe device, a Xenon flash lamp, etc.), or any other technically feasible illumination device. In certain embodiments, two or more strobe units are configured to synchronously generate strobe illumination in conjunction with sampling an image. In one embodiment, the strobe unit 336 is controlled through a strobe control signal 338 to either emit the strobe illumination 350 or not emit the strobe illumination 350. The strobe control signal 338 may be implemented using any technically feasible signal transmission protocol. The strobe control signal 338 may indicate a strobe parameter (e.g. strobe intensity, strobe color, strobe time, etc.), for directing the strobe unit 336 to generate a specified intensity and/or color of the strobe illumination 350. The strobe control signal 338 may be generated by the processor complex 310, the camera module 330, or by any other technically feasible combination thereof. In one embodiment, the strobe control signal 338 is generated by a camera interface unit within the processor complex 310 and transmitted to both the strobe unit 336 and the camera module 330 via the interconnect 334. In another embodiment, the strobe control signal 338 is generated by the camera module 330 and transmitted to the strobe unit 336 via the interconnect 334.

Optical scene information 352, which may include at least a portion of the strobe illumination 350 reflected from objects in the photographic scene, is focused as an optical image onto an image sensor 332 within the camera module 330. The image sensor 332 generates an electronic representation of the optical image. The electronic representation comprises spatial color intensity information, which may include different color intensity samples (e.g. red, green, and blue light, etc.). In other embodiments, the spatial color intensity information may also include samples for white light. The electronic representation is transmitted to the processor complex 310 via the interconnect 334, which may implement any technically feasible signal transmission protocol.

In one embodiment, input/output devices 314 may include, without limitation, a capacitive touch input surface, a resistive tablet input surface, one or more buttons, one or more knobs, light-emitting devices, light detecting devices, sound emitting devices, sound detecting devices, or any other technically feasible device for receiving user input and converting the input to electrical signals, or converting electrical signals into a physical signal. In one embodiment, the input/output devices 314 include a capacitive touch input surface coupled to a display unit 312. A touch entry display system may include the display unit 312 and a capacitive touch input surface, also coupled to processor complex 310.

Additionally, in other embodiments, non-volatile (NV) memory 316 is configured to store data when power is interrupted. In one embodiment, the NV memory 316 comprises one or more flash memory devices (e.g. ROM, PCM, FeRAM, FRAM, PRAM, MRAM, NRAM, etc.). The NV memory 316 comprises a non-transitory computer-readable medium, which may be configured to include programming instructions for execution by one or more processing units within the processor complex 310. The programming instructions may implement, without limitation, an operating system (OS), UI software modules, image processing and storage software modules, one or more input/output devices 314 connected to the processor complex 310, one or more software modules for sampling an image stack through camera module 330, one or more software modules for presenting the image stack or one or more synthetic images generated from the image stack through the display unit 312. As an example, in one embodiment, the programming instructions may also implement one or more software modules for merging images or portions of images within the image stack, aligning at least portions of each image within the image stack, or a combination thereof. In another embodiment, the processor complex 310 may be configured to execute the programming instructions, which may implement one or more software modules operable to create a high dynamic range (HDR) image.

Still yet, in one embodiment, one or more memory devices comprising the NV memory 316 may be packaged as a module configured to be installed or removed by a user. In one embodiment, volatile memory 318 comprises dynamic random access memory (DRAM) configured to temporarily store programming instructions, image data such as data associated with an image stack, and the like, accessed during the course of normal operation of the digital photographic system 300. Of course, the volatile memory may be used in any manner and in association with any other input/output device 314 or sensor device 342 attached to the process complex 310.

In one embodiment, sensor devices 342 may include, without limitation, one or more of an accelerometer to detect motion and/or orientation, an electronic gyroscope to detect motion and/or orientation, a magnetic flux detector to detect orientation, a global positioning system (GPS) module to detect geographic position, or any combination thereof. Of course, other sensors, including but not limited to a motion detection sensor, a proximity sensor, an RGB light sensor, a gesture sensor, a 3-D input image sensor, a pressure sensor, and an indoor position sensor, may be integrated as sensor devices. In one embodiment, the sensor devices may be one example of input/output devices 314.

Wireless unit 340 may include one or more digital radios configured to send and receive digital data. In particular, the wireless unit 340 may implement wireless standards (e.g. WiFi, Bluetooth, NFC, etc.), and may implement digital cellular telephony standards for data communication (e.g. CDMA, 3G, 4G, LTE, LTE-Advanced, etc.). Of course, any wireless standard or digital cellular telephony standards may be used.

In one embodiment, the digital photographic system 300 is configured to transmit one or more digital photographs to a network-based (online) or "cloud-based" photographic media service via the wireless unit 340. The one or more digital photographs may reside within either the NV memory 316 or the volatile memory 318, or any other memory device associated with the processor complex 310. In one embodiment, a user may possess credentials to access an online photographic media service and to transmit one or more digital photographs for storage to, retrieval from, and presentation by the online photographic media service. The credentials may be stored or generated within the digital photographic system 300 prior to transmission of the digital photographs. The online photographic media service may comprise a social networking service, photograph sharing service, or any other network-based service that provides storage of digital photographs, processing of digital photographs, transmission of digital photographs, sharing of digital photographs, or any combination thereof. In certain embodiments, one or more digital photographs are generated by the online photographic media service based on image data (e.g. image stack, HDR image stack, image package, etc.) transmitted to servers associated with the online photographic media service. In such embodiments, a user may upload one or more source images from the digital photographic system 300 for processing by the online photographic media service.

In one embodiment, the digital photographic system 300 comprises at least one instance of a camera module 330. In another embodiment, the digital photographic system 300 comprises a plurality of camera modules 330. Such an embodiment may also include at least one strobe unit 336 configured to illuminate a photographic scene, sampled as multiple views by the plurality of camera modules 330. The plurality of camera modules 330 may be configured to sample a wide angle view (e.g., greater than forty-five degrees of sweep among cameras) to generate a panoramic photograph. In one embodiment, a plurality of camera modules 330 may be configured to sample two or more narrow angle views (e.g., less than forty-five degrees of sweep among cameras) to generate a stereoscopic photograph. In other embodiments, a plurality of camera modules 330 may be configured to generate a 3-D image or to otherwise display a depth perspective (e.g. a z-component, etc.) as shown on the display unit 312 or any other display device.

In one embodiment, a display unit 312 may be configured to display a two-dimensional array of pixels to form an image for display. The display unit 312 may comprise a liquid-crystal (LCD) display, a light-emitting diode (LED) display, an organic LED display, or any other technically feasible type of display. In certain embodiments, the display unit 312 may be able to display a narrower dynamic range of image intensity values than a complete range of intensity values sampled from a photographic scene, such as within a single HDR image or over a set of two or more images comprising a multiple exposure or HDR image stack. In one embodiment, images comprising an image stack may be merged according to any technically feasible HDR blending technique to generate a synthetic image for display within dynamic range constraints of the display unit 312. In one embodiment, the limited dynamic range may specify an eight-bit per color channel binary representation of corresponding color intensities. In other embodiments, the limited dynamic range may specify more than eight-bits (e.g., 10 bits, 12 bits, or 14 bits, etc.) per color channel binary representation.

Figure 3B:
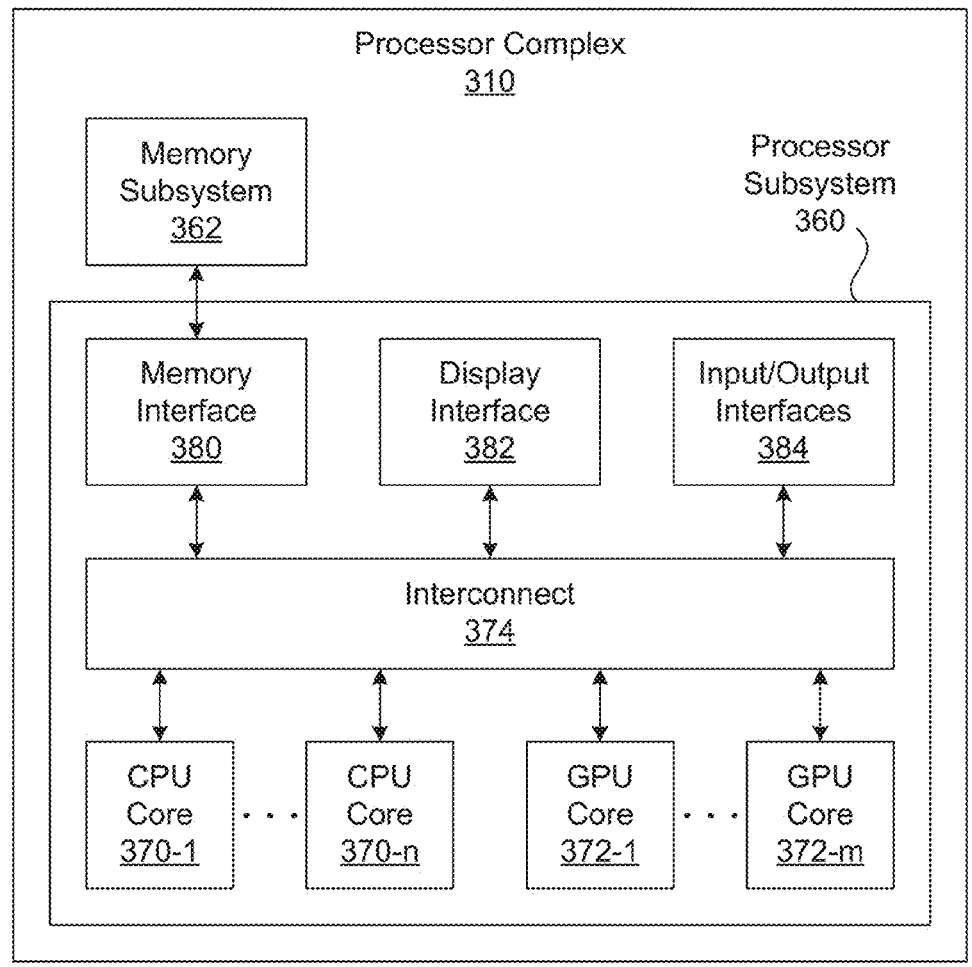
FIG. 3B illustrates a processor complex within the digital photographic system, according to one embodiment.

FIG. 3B illustrates a processor complex 310 within the digital photographic system 300 of FIG. 3A, in accordance with one embodiment. As an option, the processor complex 310 may be implemented in the context of the details of any of the Figures disclosed herein. Of course, however, the processor complex 310 may be implemented in any desired environment. Further, the aforementioned definitions may equally apply to the description below.

As shown, the processor complex 310 includes a processor subsystem 360 and may include a memory subsystem 362. In one embodiment, processor complex 310 may comprise a system on a chip (SoC) device that implements processor subsystem 360, and memory subsystem 362 comprises one or more DRAM devices coupled to the processor subsystem 360. In another embodiment, the processor complex 310 may comprise a multi-chip module (MCM) encapsulating the SoC device and the one or more DRAM devices comprising the memory subsystem 362.

The processor subsystem 360 may include, without limitation, one or more central processing unit (CPU) cores 370, a memory interface 380, input/output interfaces unit 384, and a display interface unit 382, each coupled to an interconnect 374. The one or more CPU cores 370 may be configured to execute instructions residing within the memory subsystem 362, volatile memory 318, NV memory 316, or any combination thereof. Each of the one or more CPU cores 370 may be configured to retrieve and store data through interconnect 374 and the memory interface 380. In one embodiment, each of the one or more CPU cores 370 may include a data cache, and an instruction cache. Additionally, two or more of the CPU cores 370 may share a data cache, an instruction cache, or any combination thereof. In one embodiment, a cache hierarchy is implemented to provide each CPU core 370 with a private cache layer, and a shared cache layer.

In some embodiments, processor subsystem 360 may include one or more graphics processing unit (GPU) cores 372. Each GPU core 372 may comprise a plurality of multi-threaded execution units that may be programmed to implement, without limitation, graphics acceleration functions. In various embodiments, the GPU cores 372 may be configured to execute multiple thread programs according to well-known standards (e.g. OpenGL™, WebGL™, OpenCL™, CUDA™, etc.), and/or any other programmable rendering graphic standard. In certain embodiments, at least one GPU core 372 implements at least a portion of a motion estimation function, such as a well-known Harris detector or a well-known Hessian-Laplace detector. Such a motion estimation function may be used at least in part to align images or portions of images within an image stack. For example, in one embodiment, an HDR image may be compiled based on an image stack, where two or more images are first aligned prior to compiling the HDR image.

As shown, the interconnect 374 is configured to transmit data between and among the memory interface 380, the display interface unit 382, the input/output interfaces unit 384, the CPU cores 370, and the GPU cores 372. In various embodiments, the interconnect 374 may implement one or more buses, one or more rings, a cross-bar, a mesh, or any other technically feasible data transmission structure or technique. The memory interface 380 is configured to couple the memory subsystem 362 to the interconnect 374. The memory interface 380 may also couple NV memory 316, volatile memory 318, or any combination thereof to the interconnect 374. The display interface unit 382 may be configured to couple a display unit 312 to the interconnect 374. The display interface unit 382 may implement certain frame buffer functions (e.g. frame refresh, etc.). Alternatively, in another embodiment, the display unit 312 may implement certain frame buffer functions (e.g. frame refresh, etc.). The input/output interfaces unit 384 may be configured to couple various input/output devices to the interconnect 374.

In certain embodiments, a camera module 330 is configured to store exposure parameters for sampling each image associated with an image stack. For example, in one embodiment, when directed to sample a photographic scene, the camera module 330 may sample a set of images comprising the image stack according to stored exposure parameters. A software module comprising programming instructions executing within a processor complex 310 may generate and store the exposure parameters prior to directing the camera module 330 to sample the image stack. In other embodiments, the camera module 330 may be used to meter an image or an image stack, and the software module comprising programming instructions executing within a processor complex 310 may generate and store metering parameters prior to directing the camera module 330 to capture the image. Of course, the camera module 330 may be used in any manner in combination with the processor complex 310.

In one embodiment, exposure parameters associated with images comprising the image stack may be stored within an exposure parameter data structure that includes exposure parameters for one or more images. In another embodiment, a camera interface unit (not shown in FIG. 3B) within the processor complex 310 may be configured to read exposure parameters from the exposure parameter data structure and to transmit associated exposure parameters to the camera module 330 in preparation of sampling a photographic scene. After the camera module 330 is configured according to the exposure parameters, the camera interface may direct the camera module 330 to sample the photographic scene; the camera module 330 may then generate a corresponding image stack. The exposure parameter data structure may be stored within the camera interface unit, a memory circuit within the processor complex 310, volatile memory 318, NV memory 316, the camera module 330, or within any other technically feasible memory circuit. Further, in another embodiment, a software module executing within processor complex 310 may generate and store the exposure parameter data structure.

Figure 3C:
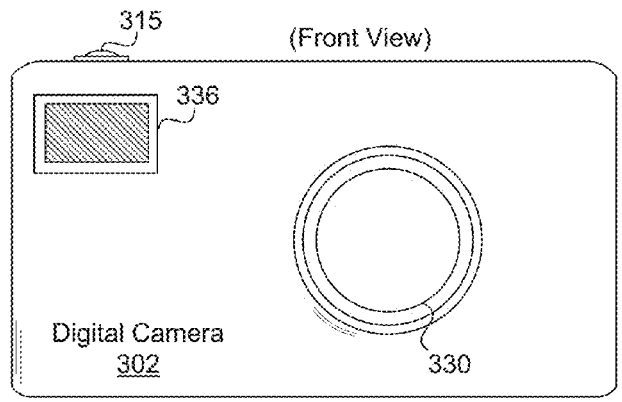
FIG. 3C illustrates a digital camera, in accordance with an embodiment.

FIG. 3C illustrates a digital camera 302, in accordance with one embodiment. As an option, the digital camera 302 may be implemented in the context of the details of any of the Figures disclosed herein. Of course, however, the digital camera 302 may be implemented in any desired environment. Further, the aforementioned definitions may equally apply to the description below.

In one embodiment, the digital camera 302 may be configured to include a digital photographic system, such as digital photographic system 300 of FIG. 3A. As shown, the digital camera 302 includes a camera module 330, which may include optical elements configured to focus optical scene information representing a photographic scene onto an image sensor, which may be configured to convert the optical scene information to an electronic representation of the photographic scene.

Additionally, the digital camera 302 may include a strobe unit 336, and may include a shutter release button 315 for triggering a photographic sample event, whereby digital camera 302 samples one or more images comprising the electronic representation. In other embodiments, any other technically feasible shutter release mechanism may trigger the photographic sample event (e.g. such as a timer trigger or remote control trigger, etc.).

Figure 3D:
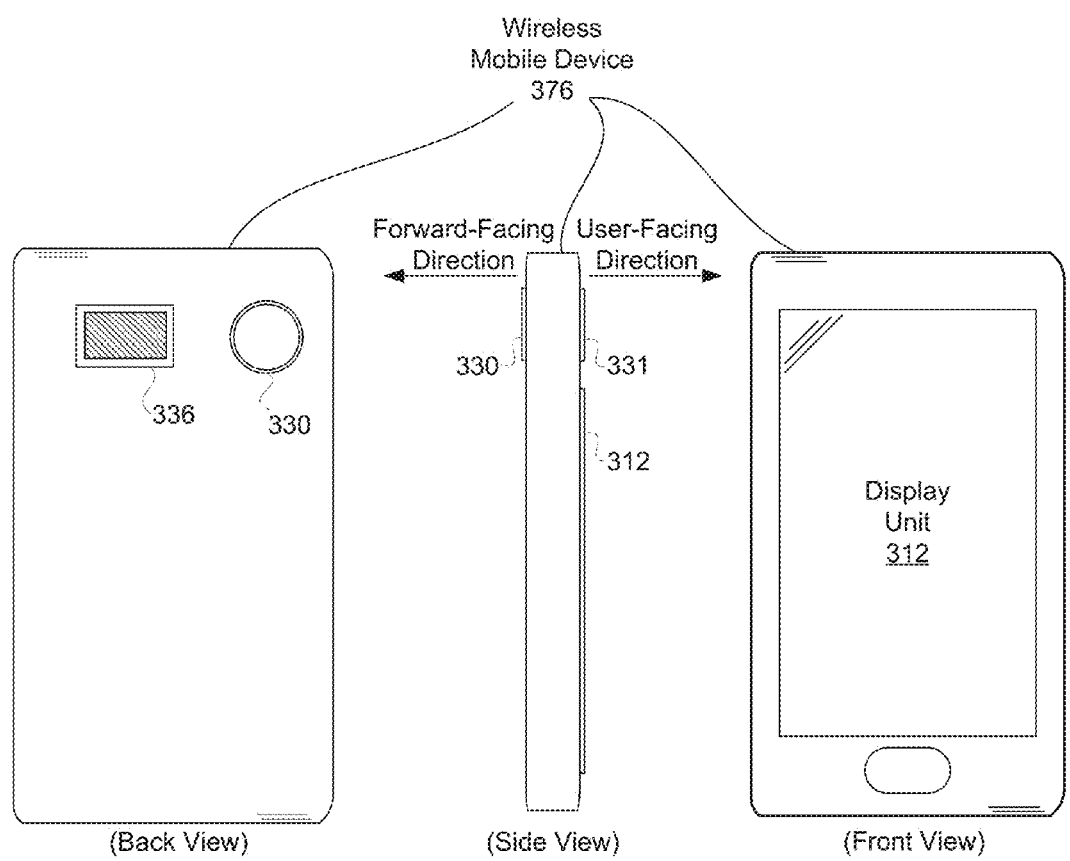
FIG. 3D illustrates a wireless mobile device, in accordance with another embodiment.

FIG. 3D illustrates a wireless mobile device 376, in accordance with one embodiment. As an option, the mobile device 376 may be implemented in the context of the details of any of the Figures disclosed herein. Of course, however, the mobile device 376 may be implemented in any desired environment. Further, the aforementioned definitions may equally apply to the description below.

In one embodiment, the mobile device 376 may be configured to include a digital photographic system (e.g. such as digital photographic system 300 of FIG. 3A), which is configured to sample a photographic scene. In various embodiments, a camera module 330 may include optical elements configured to focus optical scene information representing the photographic scene onto an image sensor, which may be configured to convert the optical scene information to an electronic representation of the photographic scene. Further, a shutter release command may be generated through any technically feasible mechanism, such as a virtual button, which may be activated by a touch gesture on a touch entry display system comprising display unit 312, or a physical button, which may be located on any face or surface of the mobile device 376. Of course, in other embodiments, any number of other buttons, external inputs/outputs, or digital inputs/outputs may be included on the mobile device 376, and which may be used in conjunction with the camera module 330.

As shown, in one embodiment, a touch entry display system comprising display unit 312 is disposed on the opposite side of mobile device 376 from camera module 330. In certain embodiments, the mobile device 376 includes a user-facing camera module 331 and may include a user-facing strobe unit (not shown). Of course, in other embodiments, the mobile device 376 may include any number of user-facing camera modules or rear-facing camera modules, as well as any number of user-facing strobe units or rear-facing strobe units.

In some embodiments, the digital camera 302 and the mobile device 376 may each generate and store a synthetic image based on an image stack sampled by camera module 330. The image stack may include one or more images sampled under ambient lighting conditions, one or more images sampled under strobe illumination from strobe unit 336, or a combination thereof.

Figure 3E:
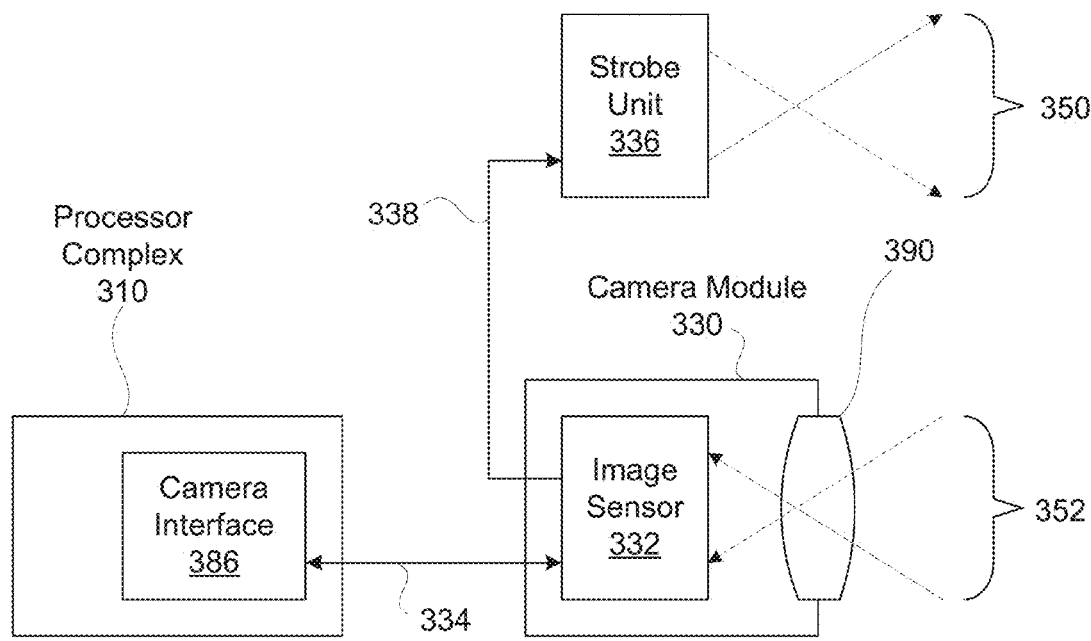
FIG. 3E illustrates a camera module configured to sample an image, according to one embodiment.

FIG. 3E illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to control strobe unit 336 through strobe control signal 338. As shown, a lens 390 is configured to focus optical scene information 352 onto image sensor 332 to be sampled. In one embodiment, image sensor 332 advantageously controls detailed timing of the strobe unit 336 though the strobe control signal 338 to reduce inter-sample time between an image sampled with the strobe unit 336 enabled, and an image sampled with the strobe unit 336 disabled. For example, the image sensor 332 may enable the strobe unit 336 to emit strobe illumination 350 less than one microsecond (or any desired length) after image sensor 332 completes an exposure time associated with sampling an ambient image and prior to sampling a strobe image.

In other embodiments, the strobe illumination 350 may be configured based on a desired one or more target points. For example, in one embodiment, the strobe illumination 350 may light up an object in the foreground, and depending on the length of exposure time, may also light up an object in the background of the image. In one embodiment, once the strobe unit 336 is enabled, the image sensor 332 may then immediately begin exposing a strobe image. The image sensor 332 may thus be able to directly control sampling operations, including enabling and disabling the strobe unit 336 associated with generating an image stack, which may comprise at least one image sampled with the strobe unit 336 disabled, and at least one image sampled with the strobe unit 336 either enabled or disabled. In one embodiment, data comprising the image stack sampled by the image sensor 332 is transmitted via interconnect 334 to a camera interface unit 386 within processor complex 310. In some embodiments, the camera module 330 may include an image sensor controller, which may be configured to generate the strobe control signal 338 in conjunction with controlling operation of the image sensor 332.

Figure 3F:
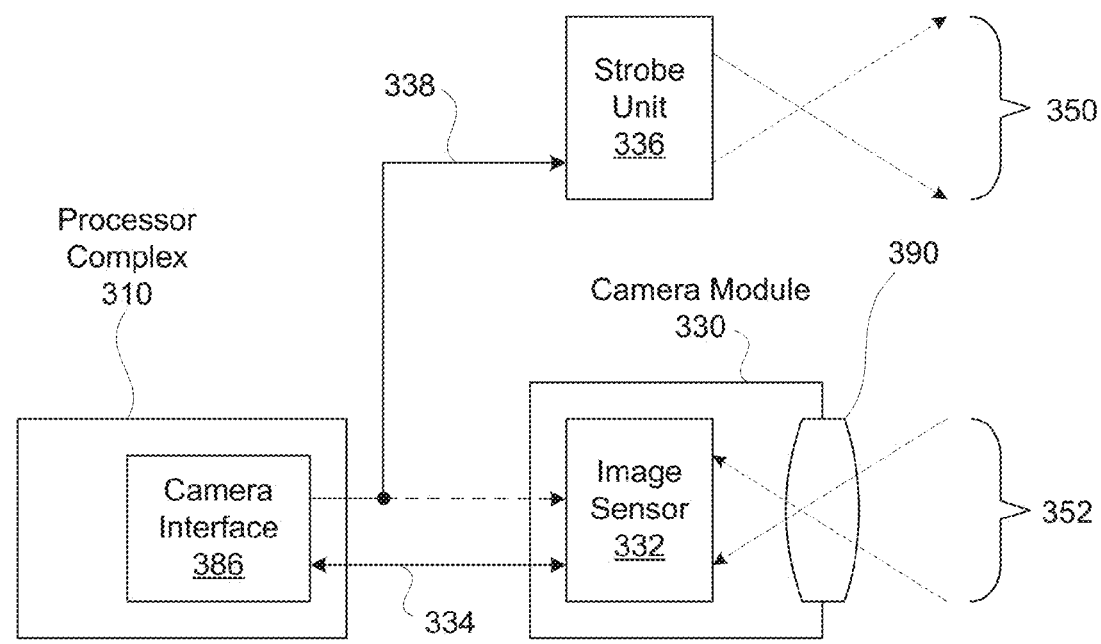
FIG. 3F illustrates a camera module configured to sample an image, according to another embodiment.

FIG. 3F illustrates a camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be configured to sample an image based on state information for strobe unit 336. The state information may include, without limitation, one or more strobe parameters (e.g. strobe intensity, strobe color, strobe time, etc.), for directing the strobe unit 336 to generate a specified intensity and/or color of the strobe illumination 350. In one embodiment, commands for configuring the state information associated with the strobe unit 336 may be transmitted through a strobe control signal 338, which may be monitored by the camera module 330 to detect when the strobe unit 336 is enabled. For example, in one embodiment, the camera module 330 may detect when the strobe unit 336 is enabled or disabled within a microsecond or less of the strobe unit 336 being enabled or disabled by the strobe control signal 338. To sample an image requiring strobe illumination, a camera interface unit 386 may enable the strobe unit 336 by sending an enable command through the strobe control signal 338. In one embodiment, the camera interface unit 386 may be included as an interface of input/output interfaces 384 in a processor subsystem 360 of the processor complex 310 of FIG. 3B The enable command may comprise a signal level transition, a data packet, a register write, or any other technically feasible transmission of a command. The camera module 330 may sense that the strobe unit 336 is enabled and then cause image sensor 332 to sample one or more images requiring strobe illumination while the strobe unit 336 is enabled. In such an implementation, the image sensor 332 may be configured to wait for an enable signal destined for the strobe unit 336 as a trigger signal to begin sampling a new exposure.

In one embodiment, camera interface unit 386 may transmit exposure parameters and commands to camera module 330 through interconnect 334. In certain embodiments, the camera interface unit 386 may be configured to directly control strobe unit 336 by transmitting control commands to the strobe unit 336 through strobe control signal 338. By directly controlling both the camera module 330 and the strobe unit 336, the camera interface unit 386 may cause the camera module 330 and the strobe unit 336 to perform their respective operations in precise time synchronization. In one embodiment, precise time synchronization may be less than five hundred microseconds of event timing error. Additionally, event timing error may be a difference in time from an intended event occurrence to the time of a corresponding actual event occurrence.

In another embodiment, camera interface unit 386 may be configured to accumulate statistics while receiving image data from camera module 330. In particular, the camera interface unit 386 may accumulate exposure statistics for a given image while receiving image data for the image through interconnect 334. Exposure statistics may include, without limitation, one or more of an intensity histogram, a count of over-exposed pixels, a count of under-exposed pixels, an intensity-weighted sum of pixel intensity, or any combination thereof. The camera interface unit 386 may present the exposure statistics as memory-mapped storage locations within a physical or virtual address space defined by a processor, such as one or more of CPU cores 370, within processor complex 310. In one embodiment, exposure statistics reside in storage circuits that are mapped into a memory-mapped register space, which may be accessed through the interconnect 334. In other embodiments, the exposure statistics are transmitted in conjunction with transmitting pixel data for a captured image. For example, the exposure statistics for a given image may be transmitted as in-line data, following transmission of pixel intensity data for the captured image. Exposure statistics may be calculated, stored, or cached within the camera interface unit 386.

In one embodiment, camera interface unit 386 may accumulate color statistics for estimating scene white-balance. Any technically feasible color statistics may be accumulated for estimating white balance, such as a sum of intensities for different color channels comprising red, green, and blue color channels. The sum of color channel intensities may then be used to perform a white-balance color correction on an associated image, according to a white-balance model such as a gray-world white-balance model. In other embodiments, curve-fitting statistics are accumulated for a linear or a quadratic curve fit used for implementing white-balance correction on an image.

In one embodiment, camera interface unit 386 may accumulate spatial color statistics for performing color-matching between or among images, such as between or among an ambient image and one or more images sampled with strobe illumination. As with the exposure statistics, the color statistics may be presented as memory-mapped storage locations within processor complex 310. In one embodiment, the color statistics are mapped in a memory-mapped register space, which may be accessed through interconnect 334, within processor subsystem 360. In other embodiments, the color statistics may be transmitted in conjunction with transmitting pixel data for a captured image. For example, in one embodiment, the color statistics for a given image may be transmitted as in-line data, following transmission of pixel intensity data for the image. Color statistics may be calculated, stored, or cached within the camera interface 386.

In one embodiment, camera module 330 may transmit strobe control signal 338 to strobe unit 336, enabling the strobe unit 336 to generate illumination while the camera module 330 is sampling an image. In another embodiment, camera module 330 may sample an image illuminated by strobe unit 336 upon receiving an indication signal from camera interface unit 386 that the strobe unit 336 is enabled. In yet another embodiment, camera module 330 may sample an image illuminated by strobe unit 336 upon detecting strobe illumination within a photographic scene via a rapid rise in scene illumination. In one embodiment, a rapid rise in scene illumination may include at least a rate of increasing intensity consistent with that of enabling strobe unit 336. In still yet another embodiment, camera module 330 may enable strobe unit 336 to generate strobe illumination while sampling one image, and disable the strobe unit 336 while sampling a different image.

Figure 3G:
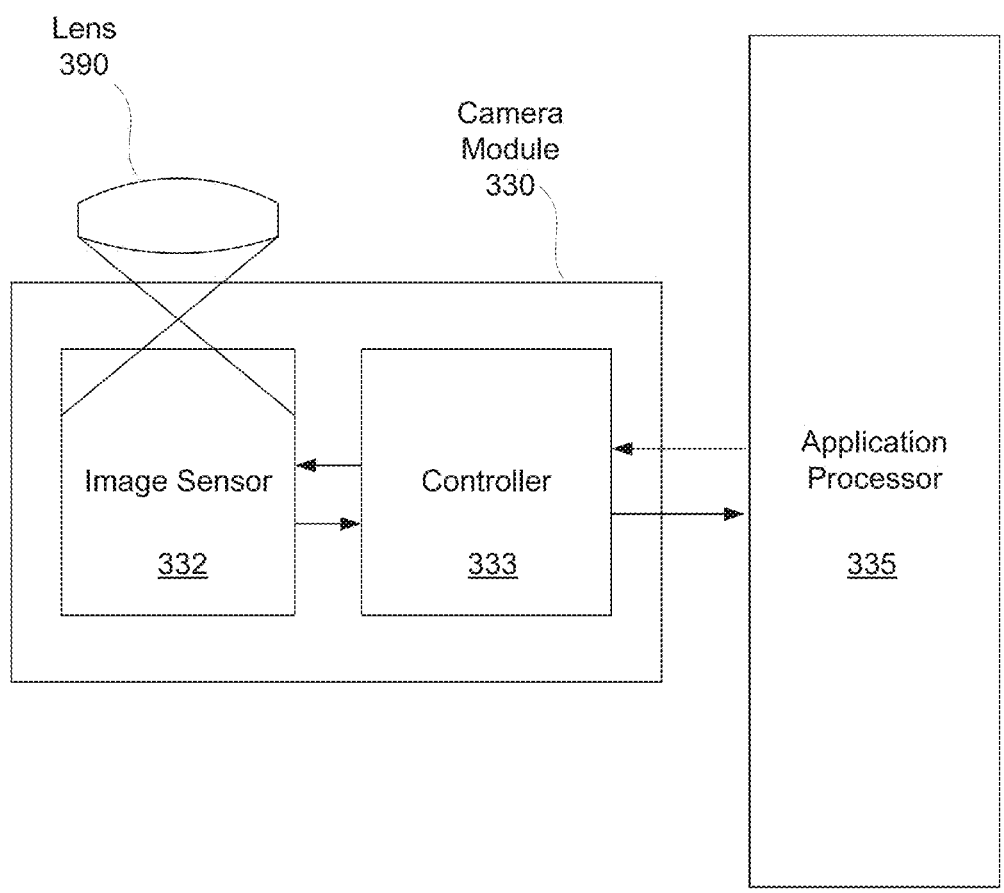
FIG. 3G illustrates a camera module in communication with an application processor, in accordance with an embodiment.

FIG. 3G illustrates camera module 330, in accordance with one embodiment. As an option, the camera module 330 may be implemented in the context of the details of any of the Figures disclosed herein. Of course, however, the camera module 330 may be implemented in any desired environment. Further, the aforementioned definitions may equally apply to the description below.

In one embodiment, the camera module 330 may be in communication with an application processor 335. The camera module 330 is shown to include image sensor 332 in communication with a controller 333. Further, the controller 333 is shown to be in communication with the application processor 335.

In one embodiment, the application processor 335 may reside outside of the camera module 330. As shown, the lens 390 may be configured to focus optical scene information onto image sensor 332 to be sampled. The optical scene information sampled by the image sensor 332 may then be communicated from the image sensor 332 to the controller 333 for at least one of subsequent processing and communication to the application processor 335. In another embodiment, the controller 333 may control storage of the optical scene information sampled by the image sensor 332, or storage of processed optical scene information.

In another embodiment, the controller 333 may enable a strobe unit to emit strobe illumination for a short time duration (e.g. less than one microsecond, etc.) after image sensor 332 completes an exposure time associated with sampling an ambient image. Further, the controller 333 may be configured to generate strobe control signal 338 in conjunction with controlling operation of the image sensor 332.

In one embodiment, the image sensor 332 may be a complementary metal oxide semiconductor (CMOS) sensor or a charge-coupled device (CCD) sensor. In another embodiment, the controller 333 and the image sensor 332 may be packaged together as an integrated system or integrated circuit. In yet another embodiment, the controller 333 and the image sensor 332 may comprise discrete packages. In one embodiment, the controller 333 may provide circuitry for receiving optical scene information from the image sensor 332, processing of the optical scene information, timing of various functionalities, and signaling associated with the application processor 335. Further, in another embodiment, the controller 333 may provide circuitry for control of one or more of exposure, shuttering, white balance, and gain adjustment. Processing of the optical scene information by the circuitry of the controller 333 may include one or more of gain application, amplification, and analog-to-digital conversion. After processing the optical scene information, the controller 333 may transmit corresponding digital pixel data, such as to the application processor 335.

In one embodiment, the application processor 335 may be implemented on processor complex 310 and at least one of volatile memory 318 and NV memory 316, or any other memory device and/or system. The application processor 335 may be previously configured for processing of received optical scene information or digital pixel data communicated from the camera module 330 to the application processor 335.

Figure 4:
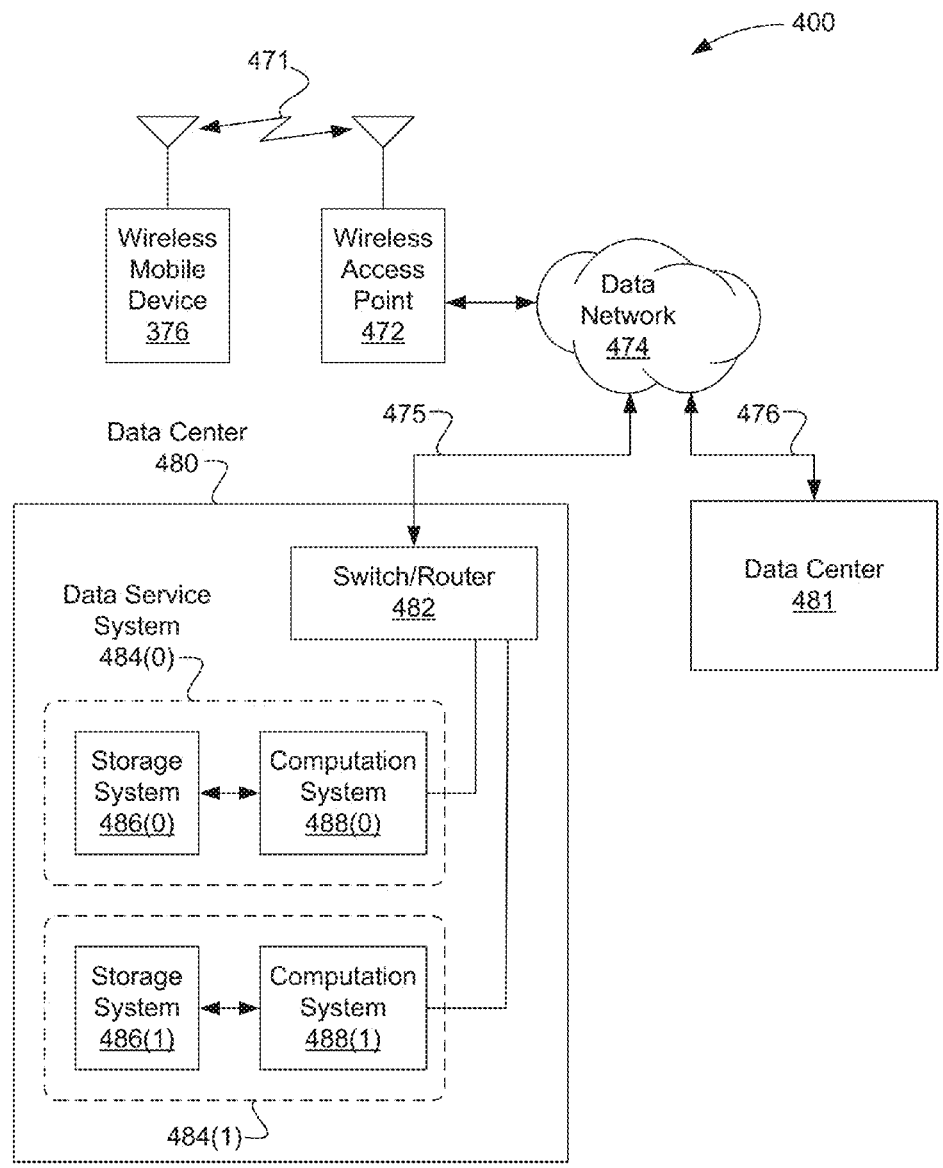
FIG. 4 illustrates a network service system, in accordance with another embodiment.

FIG. 4 illustrates a network service system 400, in accordance with one embodiment. As an option, the network service system 400 may be implemented in the context of the details of any of the Figures disclosed herein. Of course, however, the network service system 400 may be implemented in any desired environment. Further, the aforementioned definitions may equally apply to the description below.

In one embodiment, the network service system 400 may be configured to provide network access to a device implementing a digital photographic system. As shown, network service system 400 includes a wireless mobile device 376, a wireless access point 472, a data network 474, data center 480, and a data center 481. The wireless mobile device 376 may communicate with the wireless access point 472 via a digital radio link 471 to send and receive digital data, including data associated with digital images. The wireless mobile device 376 and the wireless access point 472 may implement any technically feasible transmission techniques for transmitting digital data via digital a radio link 471 without departing the scope and spirit of the present invention. In certain embodiments, one or more of data centers 480, 481 may be implemented using virtual constructs so that each system and subsystem within a given data center 480, 481 may comprise virtual machines configured to perform specified data processing and network tasks. In other implementations, one or more of data centers 480, 481 may be physically distributed over a plurality of physical sites.

The wireless mobile device 376 may comprise a smart phone configured to include a digital camera, a digital camera configured to include wireless network connectivity, a reality augmentation device, a laptop configured to include a digital camera and wireless network connectivity, or any other technically feasible computing device configured to include a digital photographic system and wireless network connectivity.

In various embodiments, the wireless access point 472 may be configured to communicate with wireless mobile device 376 via the digital radio link 471 and to communicate with the data network 474 via any technically feasible transmission media, such as any electrical, optical, or radio transmission media. For example, in one embodiment, wireless access point 472 may communicate with data network 474 through an optical fiber coupled to the wireless access point 472 and to a router system or a switch system within the data network 474. A network link 475, such as a wide area network (WAN) link, may be configured to transmit data between the data network 474 and the data center 480.

In one embodiment, the data network 474 may include routers, switches, long-haul transmission systems, provisioning systems, authorization systems, and any technically feasible combination of communications and operations subsystems configured to convey data between network endpoints, such as between the wireless access point 472 and the data center 480. In one implementation, a wireless the mobile device 376 may comprise one of a plurality of wireless mobile devices configured to communicate with the data center 480 via one or more wireless access points coupled to the data network 474.

Additionally, in various embodiments, the data center 480 may include, without limitation, a switch/router 482 and at least one data service system 484. The switch/router 482 may be configured to forward data traffic between and among a network link 475, and each data service system 484. The switch/router 482 may implement any technically feasible transmission techniques, such as Ethernet media layer transmission, layer 2 switching, layer 3 routing, and the like. The switch/router 482 may comprise one or more individual systems configured to transmit data between the data service systems 484 and the data network 474.

In one embodiment, the switch/router 482 may implement session-level load balancing among a plurality of data service systems 484. Each data service system 484 may include at least one computation system 488 and may also include one or more storage systems 486. Each computation system 488 may comprise one or more processing units, such as a central processing unit, a graphics processing unit, or any combination thereof. A given data service system 484 may be implemented as a physical system comprising one or more physically distinct systems configured to operate together. Alternatively, a given data service system 484 may be implemented as a virtual system comprising one or more virtual systems executing on an arbitrary physical system. In certain scenarios, the data network 474 may be configured to transmit data between the data center 480 and another data center 481, such as through a network link 476.

In another embodiment, the network service system 400 may include any networked mobile devices configured to implement one or more embodiments of the present invention. For example, in some embodiments, a peer-to-peer network, such as an ad-hoc wireless network, may be established between two different wireless mobile devices. In such embodiments, digital image data may be transmitted between the two wireless mobile devices without having to send the digital image data to a data center 480.

Figure 5:
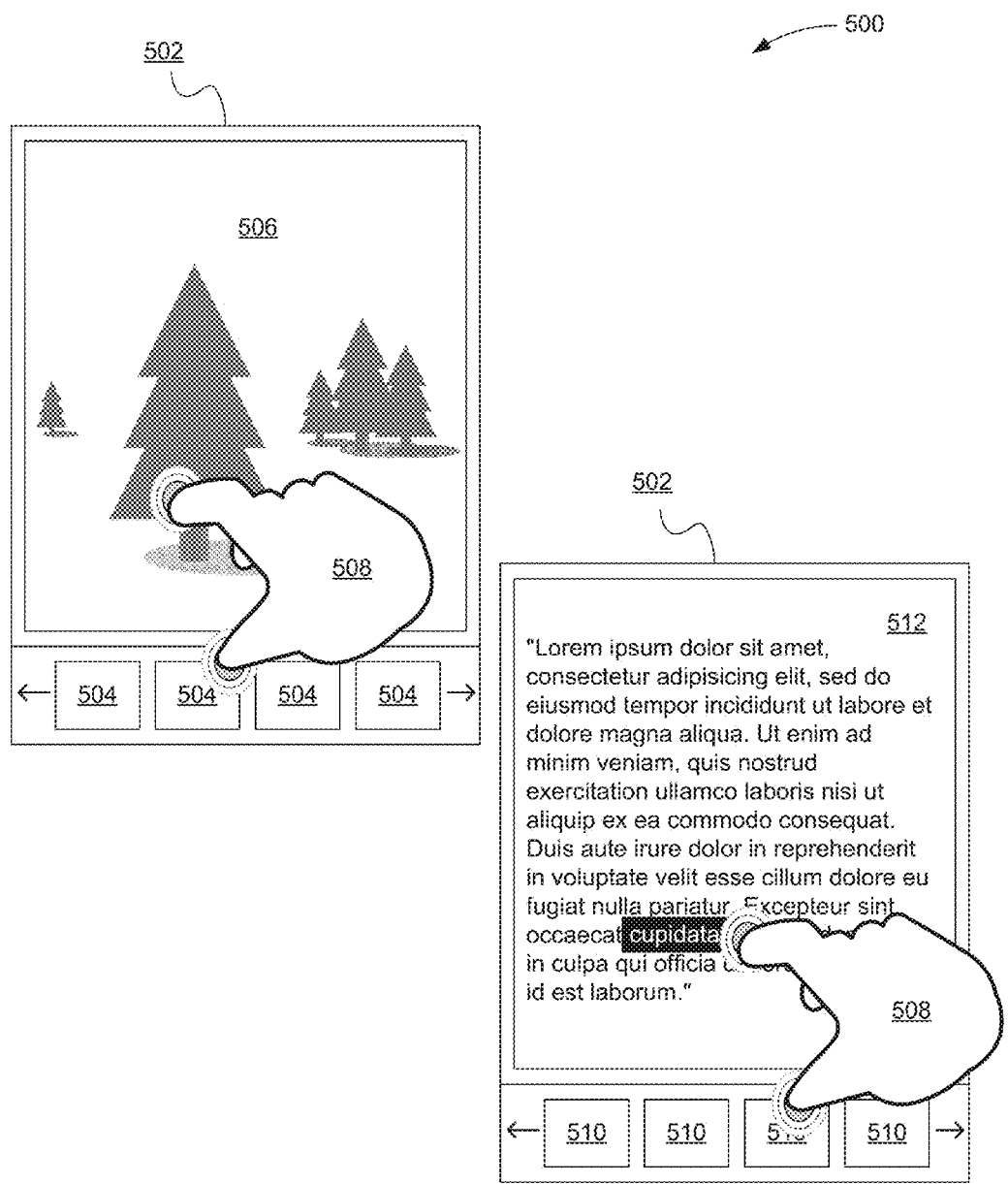
FIG. 5 illustrates user interfaces for computing operations based on a first and second user input, in accordance with one possible embodiment

FIG. 5 illustrates user interfaces 500 for computing operations based on a first and second user input, in accordance with one possible embodiment. As an option, the user interfaces 500 may be implemented in the context of the details of any of the Figures. Of course, however, the user interfaces 500 may be implemented in any desired environment. Further, the aforementioned definitions may equally apply to the description below.

As shown, user interfaces 500 may include a device 502 with a touchscreen, a first set of features 504, a first display 506, and a user input 508. Additionally, a second display 512, and a second set of features 510 are shown.

In one embodiment, a first set of features may include an ability to modify a black point, white point, median point, saturation, color value, contrast, exposure, etc. Additionally, a second set of features may include an ability to select, copy, cut, paste, move, stretch, search (e.g. research the term online, etc.), define, show a synonym, show an antonym, check spelling, check grammar, etc. Of course, any feature may be included in the listed features.

In another embodiment, the set of features may relate to the content presented on the display. For example, in various embodiments, if the content related to an image, features presented would also relate to an image. In like manner, if the content related to text, features presented would also relate to text. Certain features may have analogous meaning to both text and images, such as selection. For example, in certain embodiments, a selection feature may apply to both text an image content.

In a specific embodiment, a user may select an object (e.g. image, text, etc.) through a series of actions. For example, in one embodiment, the object may include text, and a first input may include selecting a function (e.g. copy, paste, etc.), and a first action associated with a second input may be to set a cursor at a position in the text (e.g. next to a word, etc.). Of course, in some embodiments, the cursor may be repositioned as desired. In one embodiment, once the first action is complete, a second action may include a swipe motion, the swipe motion highlighting adjoining letters and words based on the direction of the swipe (e.g. swiping to the left highlights letters to the left, swiping to the right highlights letters to the right, etc.). Once the second action is complete (i.e. the finger is lifted from the screen, etc.), the user may redo the first and second actions if desired (e.g. the wrong text was highlighted, etc.). Once the first input is complete (i.e. the finger is lifted from the screen, etc.), then the function associated with the first input may be applied to the selection.

In one embodiment, selecting an object may include applying a feathering. For example, in one embodiment, after making a selection (e.g. drawing a circle around an object, etc.), feathering may include blending the circle (e.g. a set number of pixels, etc.) with adjoining pixels. Or, in another embodiment, feathering may be applied after making a selection and then determining an edge associated with one or more objects, the feathering applied to the determined edge. In certain embodiments, the feathering defines an opacity (alpha) value per pixel, with opacity diminishing as a function of distance from the edge of a selection.

In another embodiment, selecting an object may include using a predetermined radius. For example, in one embodiment, selecting may include receiving a touch command which may correspond with a paint brush size, which may include a very small radius (e.g. for more fine control, etc.) or a very large radius, and/or any predetermined size.

Figure 6:
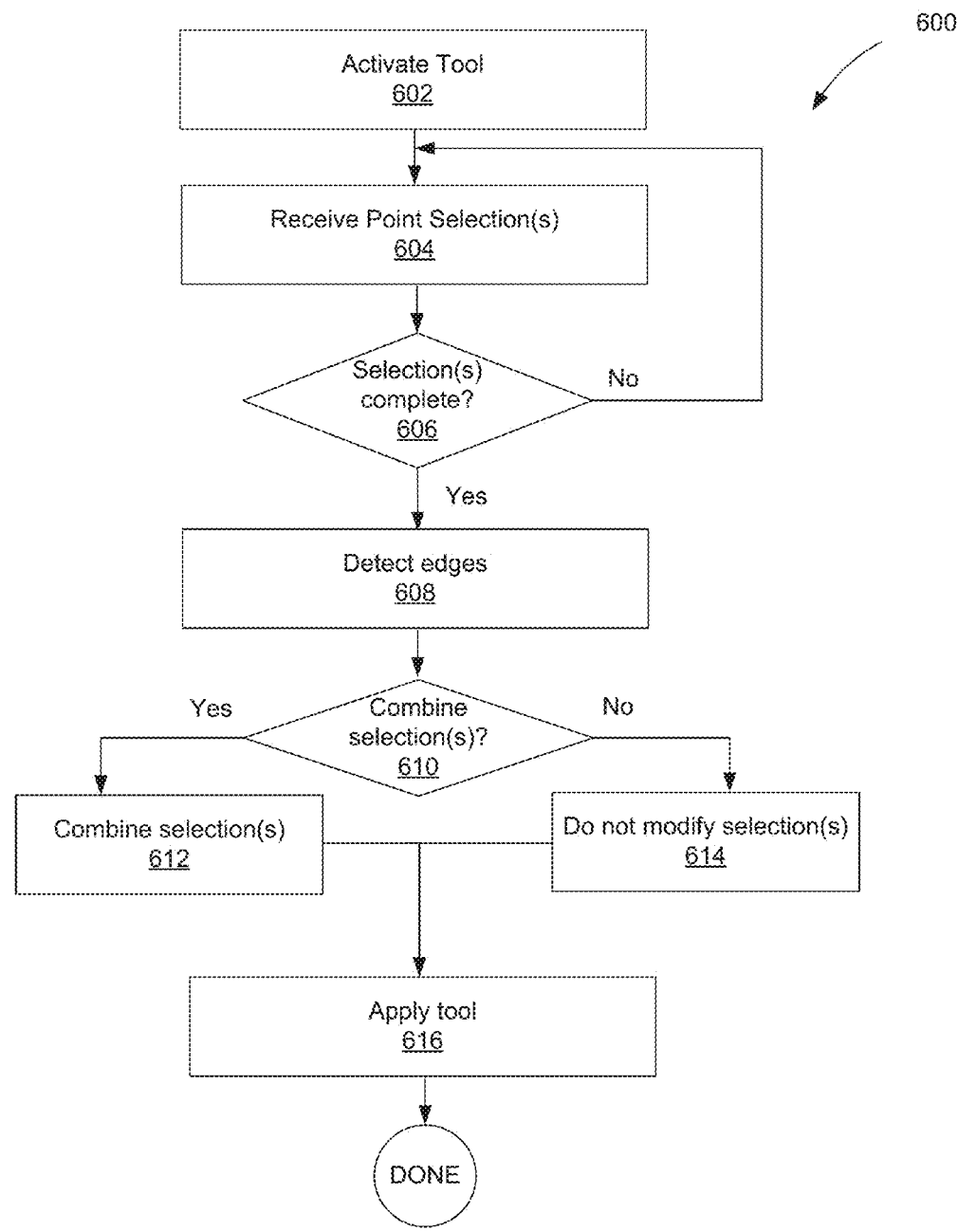
FIG. 6 illustrates a method for applying a tool on a first and second user input, in accordance with one possible embodiment.

FIG. 6 illustrates a method 600 for applying a tool on a first and second user input, in accordance with one possible embodiment. As an option, the method 600 may be carried out in the context of the details of any of the Figures. Of course, however, the method 600 may be carried out in any desired environment. Further, the aforementioned definitions may equally apply to the description below.

As shown, a tool is activated. See operation 602. For example, the tool may be activated based on a first input associated with the user (e.g. selecting a feature, etc.). Next, point selection(s) are received. See operation 604. In one embodiment, the point selection may correspond with a second input associated with the user (e.g. selecting one or more points on the display, etc.).

In various embodiments, the point selection may include selecting a point on the display. The point may be associated with a configurable radius and/or shape. For example, in one embodiment, the user may select a circle shape with a radius of 20 pixels and touch the screen at a location. Of course, the shape and radius may be configured as desired by the user. In another embodiment, the point selection may correspond with a touch down point (e.g. where a user touches a screen, etc.) associated with the second input. In this manner, a point selection(s) may correspond with a second input.

In one embodiment, one or more tools may be activated based on a first input and a second input, in combination with an activation zone. For example, in one embodiment, a first input may be inputted within a set location (e.g. bottom ⅓ of the screen, etc.), the set location being an activation zone. An activation zone may be triggered once a first input is received in the set location, and a second input is received while the first input is continuously being received within the set location.

In one embodiment, after receiving the second input (e.g. a first point selection, etc.), the user may discontinue the second input (e.g. remove finger, etc.). At this point, the user may select another point to add to the first point selection. Additionally, the user may delete a preselected point and/or modify that which is selected. As shown, it is determined whether the selection(s) are complete. See decision 606. In various embodiments, the selection may be considered complete by selecting a verification (e.g. "are you done with your selection? Select 'yes' or 'no'," etc.), discontinuing the second input (e.g. remove finger, etc.), providing feedback (e.g. shake the device, etc.), etc.

As shown, edges may be detected. See operation 608. In one embodiment, the edges may be detected for the point selection(s). For example, in one embodiment, a user may select a square shape with a set radius and select a window object. The edges near (e.g. within a predetermined number of pixels, etc.) the square point selection may be detected. In various embodiments, any technically feasible method and/or technique may be employed by one skilled in the art for detecting an edge.

In one embodiment, detected edges may overlap. As such, it is determined whether to combine selection(s). See decision 610. For example, in one embodiment, a first point may correspond with a first tree, and a second point may correspond with a second tree. The first and second points may not overlap, but the first and second trees may overlap in part. Based on the edge detection of the trees, it may be determined that there is an overlap between the two objects associated with the first point and second point. In such an embodiment, a union between the two selections may occur (e.g. to form one selection, etc.). In a separate embodiment, edge detection may occur prior to determining whether selection(s) are complete.

As shown, in response to determining whether to combine selection(s), selection(s) are combined (see operation 612) or selection(s) are not modified (see operation 614). Afterward, the tool is applied. See operation 616. In one embodiment, the applying of the tool may correspond with an action (e.g. user removing first input, etc.), with an indication of completion (e.g. selection is complete, apply the [X] feature, etc.), and/or any other input which may cause the one or more operations corresponding with the tool to be applied.

Figure 7:
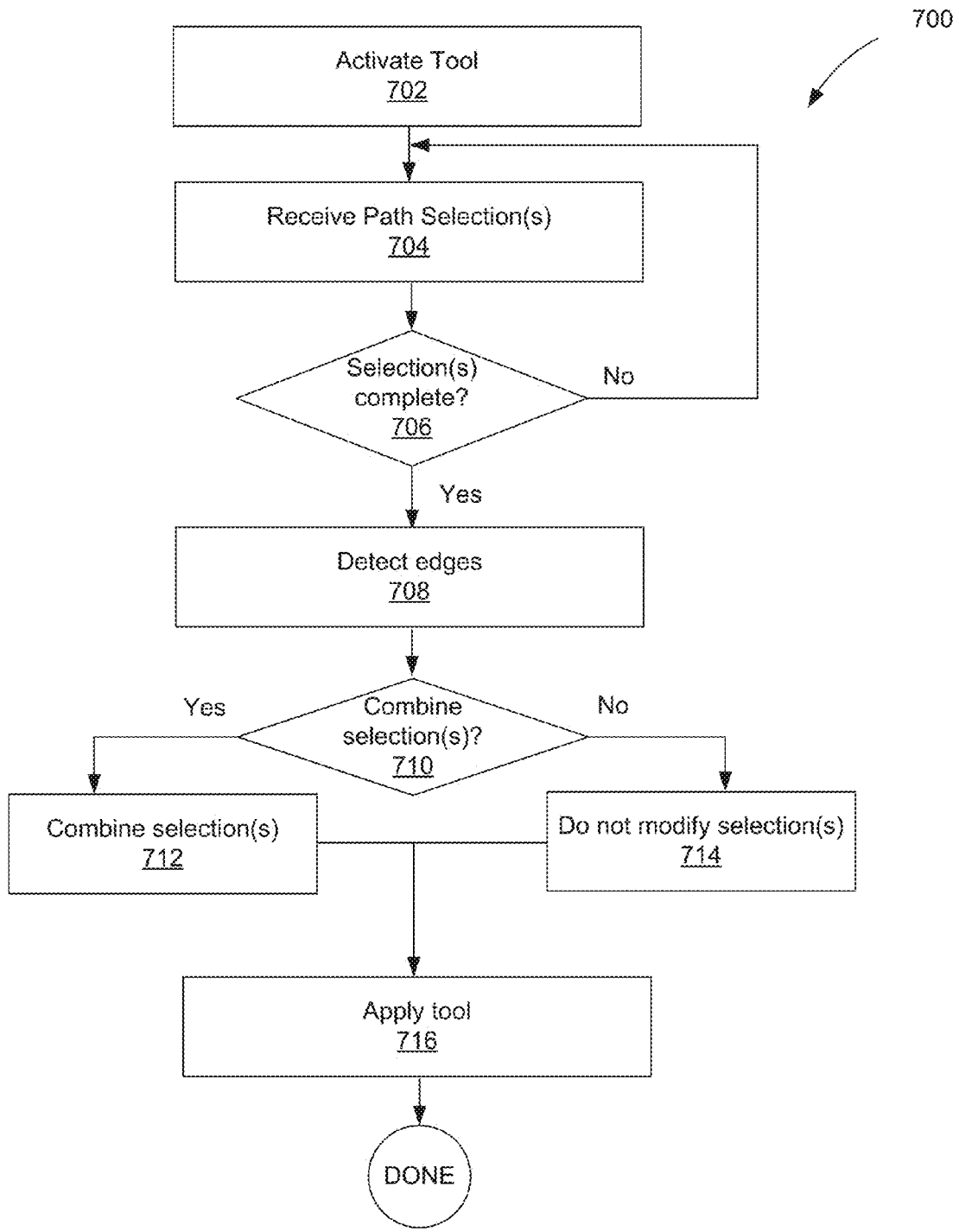
FIG. 7 illustrates a method for applying a tool on a first and second user input, in accordance with one possible embodiment.

FIG. 7 illustrates a method 700 for applying a tool on a first and second user input, in accordance with one possible embodiment. As an option, the method 700 may be carried out in the context of the details of any of the Figures. Of course, however, the method 700 may be carried out in any desired environment. Further, the aforementioned definitions may equally apply to the description below.

As shown, a tool is activated. See operation 702. For example, the tool may be activated based on a first input associated with the user (e.g. selecting a feature, etc.). Next, path selection(s) are received. See operation 704. In one embodiment, the path selection may correspond with a second input associated with the user (e.g. selecting one or more paths on the display, etc.).

In various embodiments, the path selection may include selecting a path on the display. The path may be associated with a configurable radius. For example, in one embodiment, the user may select a set radius of 20 pixels and draw a pattern on the screen. Of course, the radius may be configured as desired by the user.

In one embodiment, one or more tools may be activated based on a first input and a second input, in combination with an activation zone. For example, in one embodiment, a first input may be inputted within a set location (e.g. bottom ⅓ of the screen, etc.), the set location being an activation zone. An activation zone may be triggered once a first input is received in the set location, and a second input is received while the first input is continuously being received within the set location.

In one embodiment, after receiving the second input (e.g. a first path selection, etc.), the user may discontinue the second input (e.g. remove finger, etc.). At this point, the user may select another path to add to the first path selection. Additionally, the user may delete a preselected path and/or modify that which is selected. As shown, it is determined whether the selection(s) are complete. See decision 706. In various embodiments, the selection may be considered complete by selecting a verification (e.g. "are you done with your selection? Select 'yes' or 'no'," etc.), discontinuing the second input (e.g. remove finger, etc.), providing feedback (e.g. shake the device, etc.), etc.

As shown, edges may be detected. See operation 708. In one embodiment, the edges may be detected for the path selection(s). In various embodiments, any technically feasible method and/or technique may be employed by one skilled in the art for detecting an edge.

In one embodiment, detected edges may overlap. As such, it is determined whether to combine selection(s). See decision 710. For example, in one embodiment, a first path may be associated with a first tree, and a second point may be associated with a second tree. The first and second points may not overlap, but the first and second trees may overlap in part. Based on the edge detection of the trees, it may be determined that there is an overlap between the two objects associated with the first path and second path. In such an embodiment, a union between the two selections may occur (e.g. to form one selection, etc.). In a separate embodiment, edge detection may occur prior to determining whether selection(s) are complete.

As shown, in response to determining whether to combine selection(s), selection(s) are combined (see operation 712) or selection(s) are not modified (see operation 714). Afterward, the tool is applied. See operation 716. In one embodiment, the applying of the tool may correspond with an action (e.g. user removing first input, etc.), with an indication of completion (e.g. selection is complete, apply the [X] feature, etc.), and/or any other input which may cause the one or more operations corresponding with the tool to be applied.

In one embodiment, path selection(s) may be associated with a pressure input. For example, the harder a user presses on the screen, the greater the selection will be affected by the tool (e.g. the tool will be applied to a greater degree, etc.).

In an alternative embodiment, path selection(s) may be associated with a percentage of intensity. For example, a user may select a first region and the selection may relate to a 25% intensity, and/or may select a second region and the selection may relate to a 50% intensity. In another embodiment, receiving a path over an area of the display which has already been selected may cause the percentage to aggregate. For example, if a first region was selected at 25% intensity, and a path was reapplied over the first region, such first region may now be at 50% intensity, the 25% intensity path having passed over the first selection twice. In this manner, path selection(s) may be similar to digital airbrushing.

In one embodiment, inputting path selection(s) may include inputting a selection path that comes near (or actually does) cross another selection path. In such an embodiment, the more than one selection paths may be merged (e.g. form a union, etc.). In one embodiment, the ability to combine the two or more paths may be dependent on a predetermined threshold (e.g. the paths be within 5 pixels of each other, etc.).

Figure 8:
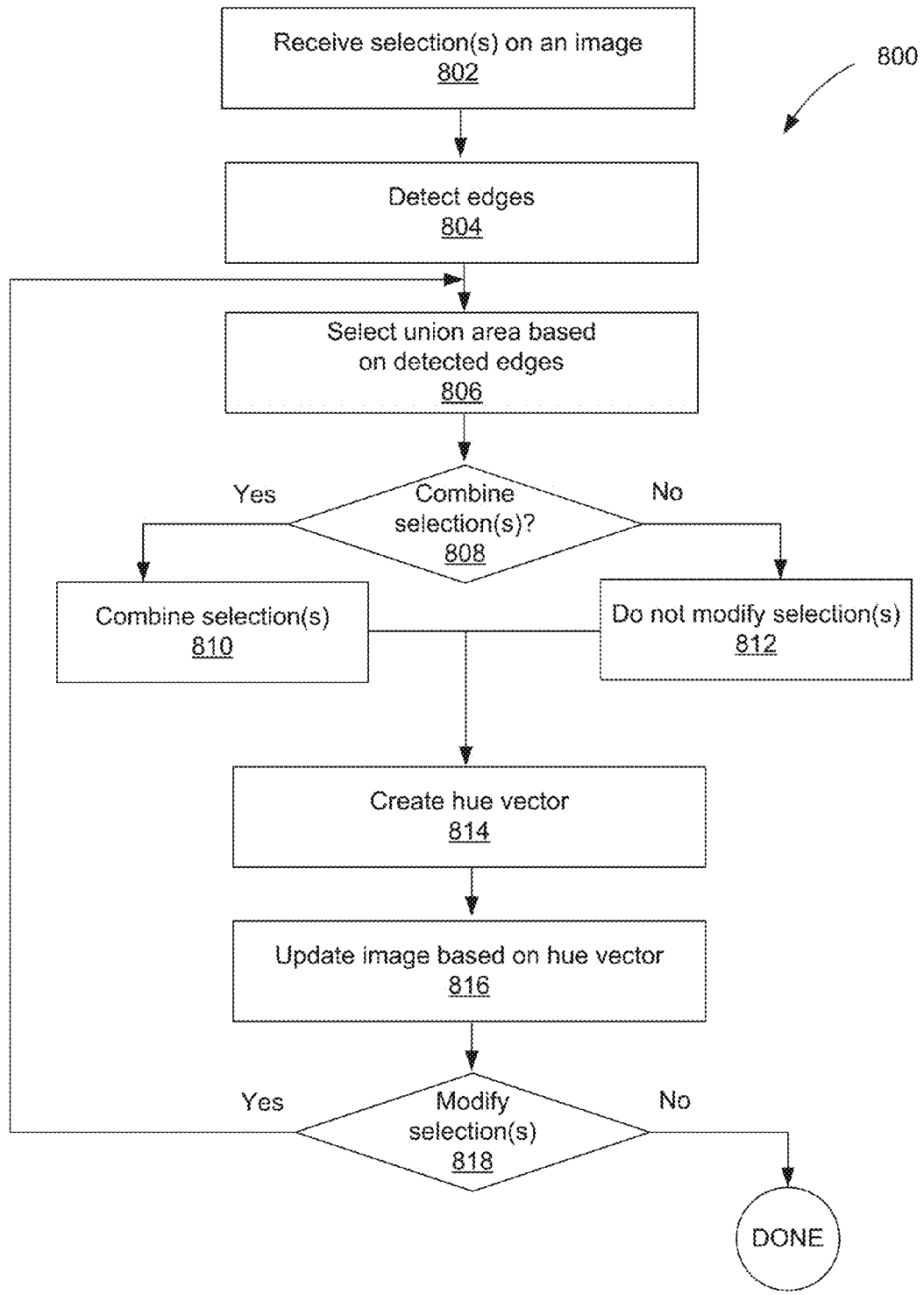
FIG. 8 illustrates a method for updating an image based on a hue vector, in accordance with one possible embodiment.

FIG. 8 illustrates method 800 for updating an image based on a hue vector, in accordance with one possible embodiment. As an option, the method 800 may be carried out in the context of the details of any of the Figures. Of course, however, the method 800 may be carried out in any desired environment. Further, the aforementioned definitions may equally apply to the description below.

As shown, selection(s) are received on an image. See operation 802. For example, the selection(s) may include point or path selections, as herein disclosed in the context of FIGS. 6 and 7. Next, edges may be detected. See operation 804. As disclosed herein, any technically feasible method or technique may be used to detect edges. Additionally, in other embodiments, edge detection may occur prior to selecting union area, or may occur after selecting a union area.

Further, union area may be selected based on detected edges. See operation 806. In one embodiment, the union area may include any overlapping paths and/or points, as herein disclosed. Next, it is determined whether to combine the selection(s). See decision 808. As shown, in response to determining whether to combine selection(s), selection(s) are combined (see operation 810) or selection(s) are not modified (see operation 812).

Next, a hue vector is created. See operation 814. In the context of the present description, a hue vector includes a vector with discrete entries corresponding to discrete hue values. For example, in one embodiment, if the hue of pixels in an image is quantized into an 8-bit integer, then the hue vector would include 2^8 or 256 discrete entries. Additionally, in one embodiment, a hue vector may be represented as an array of corresponding size (e.g. hueVector[256], etc.).

In one embodiment, a hue vector may store a 1.0 or 0.0, which may be represented as a float value, or compactly as a binary value. As shown below in Equation 1, the hue of each pixel in the image is tested against the hueVector and the result is multiplied by the saturation of the pixel:

$$resultingSat = pixelSat * hueVector[pixelHue] \quad (Eq. 1)$$

In one embodiment, Equation 1 allows each entry in hueVector[ ] to be either 1.0 or 0.0. Therefore, Equation 1 may either leave a given pixel alone (e.g. hueVector element value of 1.0, etc.) or apply the tool and/or feature (e.g. de-saturate, etc.) to the pixel (e.g. hueVector element value of 0.0, etc.). In one embodiment, a hueVector entry may be assigned for each possible quantization of hue. In contrast, conventional selective saturation operations do not provide saturation decisions on a per hue quantization level basis.

In one embodiment, the hueVector may be selected and populated by first setting every entry in hueVector to 0.0. Then, an arbitrary region may be selected, and hues of each pixel within the arbitrary region may be sampled and a corresponding hueVector entry is set to 1.0 based on the sampled hue. Next, the hueVector may be applied to the entire image comprising the region. In this manner, each pixel in the selected region may be left alone with respect to saturation. Additionally, other pixels not in the selected region may be left alone that have a hue associated with pixels in the region and de-saturating all the other pixels in the image. In this manner, hue values may be more precisely selected and modified.

Figure 9:
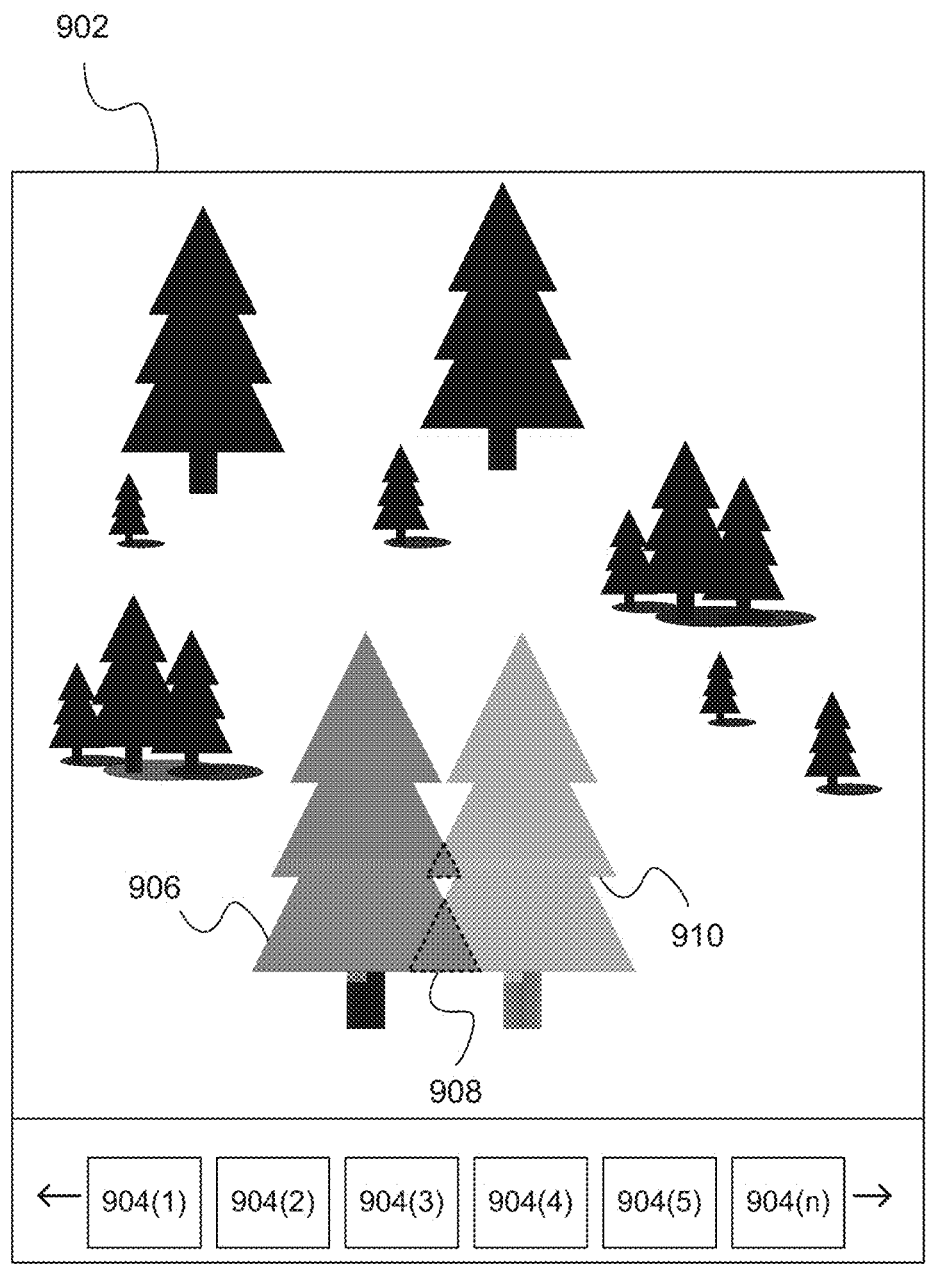
FIG. 9 illustrates a user interface for combining one or more selections, in accordance with one possible embodiment.

FIG. 9 illustrates a user interface 900 for combining one or more selections, in accordance with one possible embodiment. As an option, the user interface 900 may be implemented in the context of the details of any of the Figures. Of course, however, the user interface 900 may be implemented in any desired environment. Further, the aforementioned definitions may equally apply to the description below.

As shown, user interface 900 includes a display 902, one or more features 904(1), 904(2) . . . 904(n), a first selection 906, a second selection 910, and an overlap area 908. In one embodiment, the first selection may have occurred by a point selection (e.g. touchdown on the tree, etc.) or a path selection (e.g. scribble in the vicinity of the tree, etc.). Additionally, the second selection may have occurred by a point selection (e.g. touchdown on the tree, etc.) or a path selection (e.g. scribble in the vicinity of the tree, etc.).

In one embodiment, the first selection 906 and the second selection 910 may include overlap area 908. In another embodiment, edges associated with the first selection 906 and edges associated with the second selection 910 may include overlap area 908. Of course, any selected area, or areas selected as a result of detected areas, may be modified and/or configured as desired. In one embodiment, inputted selections and/or edge detection may contribute to defining a region of contribution. In the context of the present description, a region of contribution is a region to which the one or more operations may be applied.

As an example, in one embodiment, the user may input a path associated with tracing around a flower petal. After doing so, edge detection may be used to more clearly define what is part of the flower petal and what is not part of the flower petal. In one embodiment, anything within the boundaries of the edge detection may be a region of contribution. In other embodiments, only the radius of the inputted selection may be a region of contribution, as refined by the detected edges. In one embodiment, after determining the edges of the petal, the user may add additional selections to the region of contribution by inputting a selection (e.g. point selection, path selection, etc.) for the inside of the flower petal.

The one or more features 904 may correspond with a first input area, and the display 902 may correspond with a second input area. Further, the one or more features 904 may correspond with one or more operations to be applied to selections in the display 902. In this manner, a first input of the one or more features 904 may be necessary in combination with the second input on the display 902 before the one or more operations associated with the one or more features 904 is applied.

Figure 10:
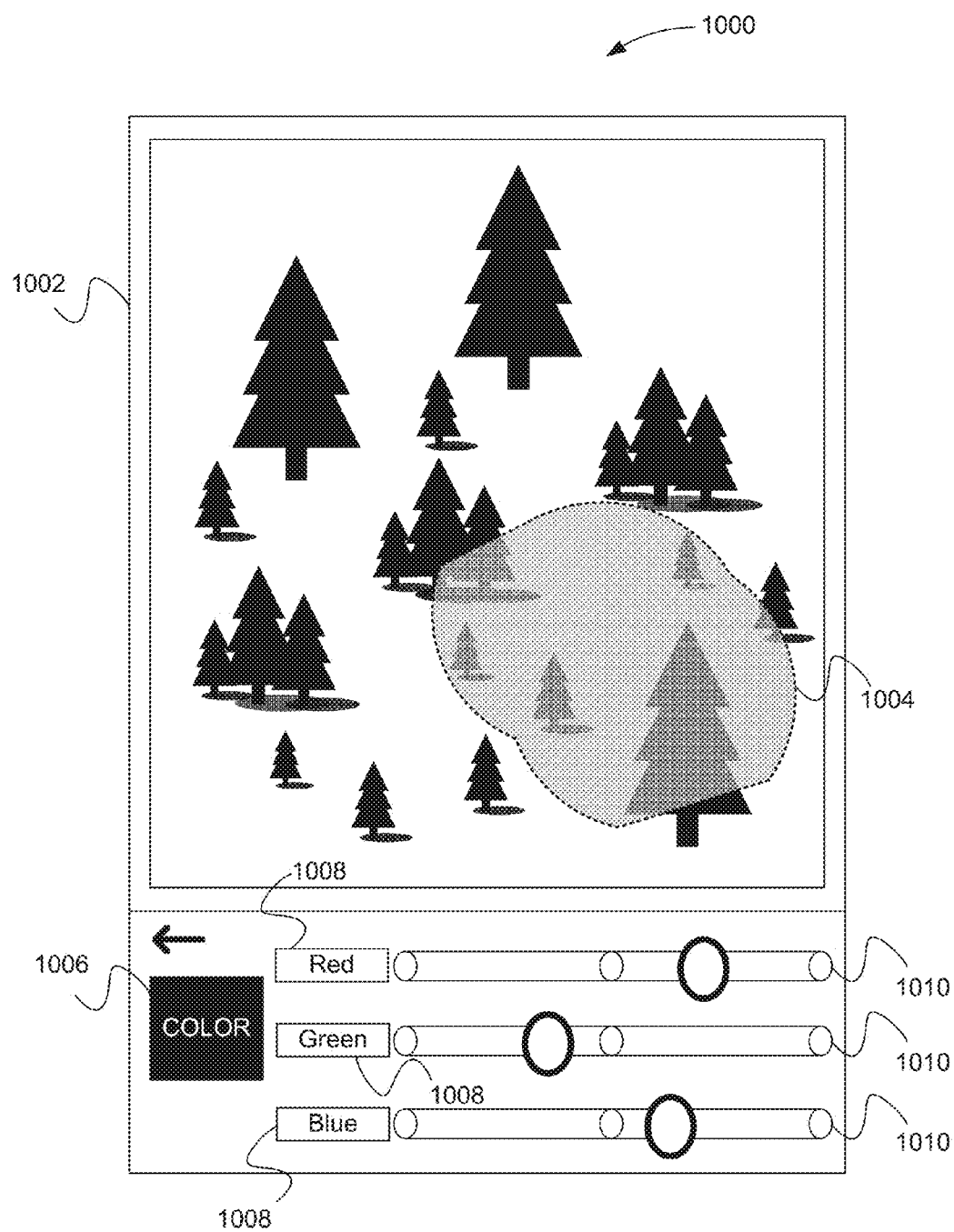
FIG. 10 illustrates a user interface for combining one or more selections, in accordance with one possible embodiment.

FIG. 10 illustrates a user interface 1000 for combining one or more selections, in accordance with one possible embodiment. As an option, the user interface 1000 may be implemented in the context of the details of any of the Figures. Of course, however, the user interface 1000 may be implemented in any desired environment. Further, the aforementioned definitions may equally apply to the description below.

As shown, user interface 1000 includes display 1002, selection 1004, a selected feature 1006, one or more subfeatures 1008, and one or more sliders 1010 which corresponds with the one or more subfeatures 1008.

In one embodiment, the selection 1004 may be based on a path selection (e.g. dotted line shown in 1004, etc.). In response to the path selection, in one embodiment, the area inside of the path selection may be included as part of the selection. Although not shown, edge detection may occur for the one or more objects contained within the selection 1004.

In one specific embodiment, the selected feature 1006 may include a color feature. In one embodiment, the color feature may include one or more subfeatures 1008 for altering the red channel, the green channel, and the blue channel. In one embodiment, a slider may correspond with each of the red, green, and blue channels.

In one embodiment, the one or more subfeatures 1008 may be displayed after the first input and the second input are complete. For example, in one embodiment, the first input may select color and while continuously selecting color, the second input may be received (e.g. selection 1004, etc.). After finishing the first input and the second input (e.g. fingers are removed, etc.), the one or more operations associated with color may be applied to the selected region. In one embodiment, immediately after applying the feature (e.g. color, etc.), the subfeatures may be displayed to refine that one or more operations as they are applied to the selected region.

In another embodiment, selected regions and corresponding operations may be saved for later manipulation. For example, after applying a series of operations (e.g. multiple combinations of first and second inputs, etc.), a user may touch any of the displayed objects, and a corresponding list of applied operations may be listed (e.g. touch the tree and the "color" operation may be listed, etc.). In a separate embodiment, each of the operations applied to selections within the image may be listed on a separate pane and/or screen of the device. For example, a history screen may show that which was applied to the image. Or, in another embodiment, a layers screen may show the blending of multiple images, and an operations screen may list any of the operations currently being applied to one or more selections of the image.

Figure 11:
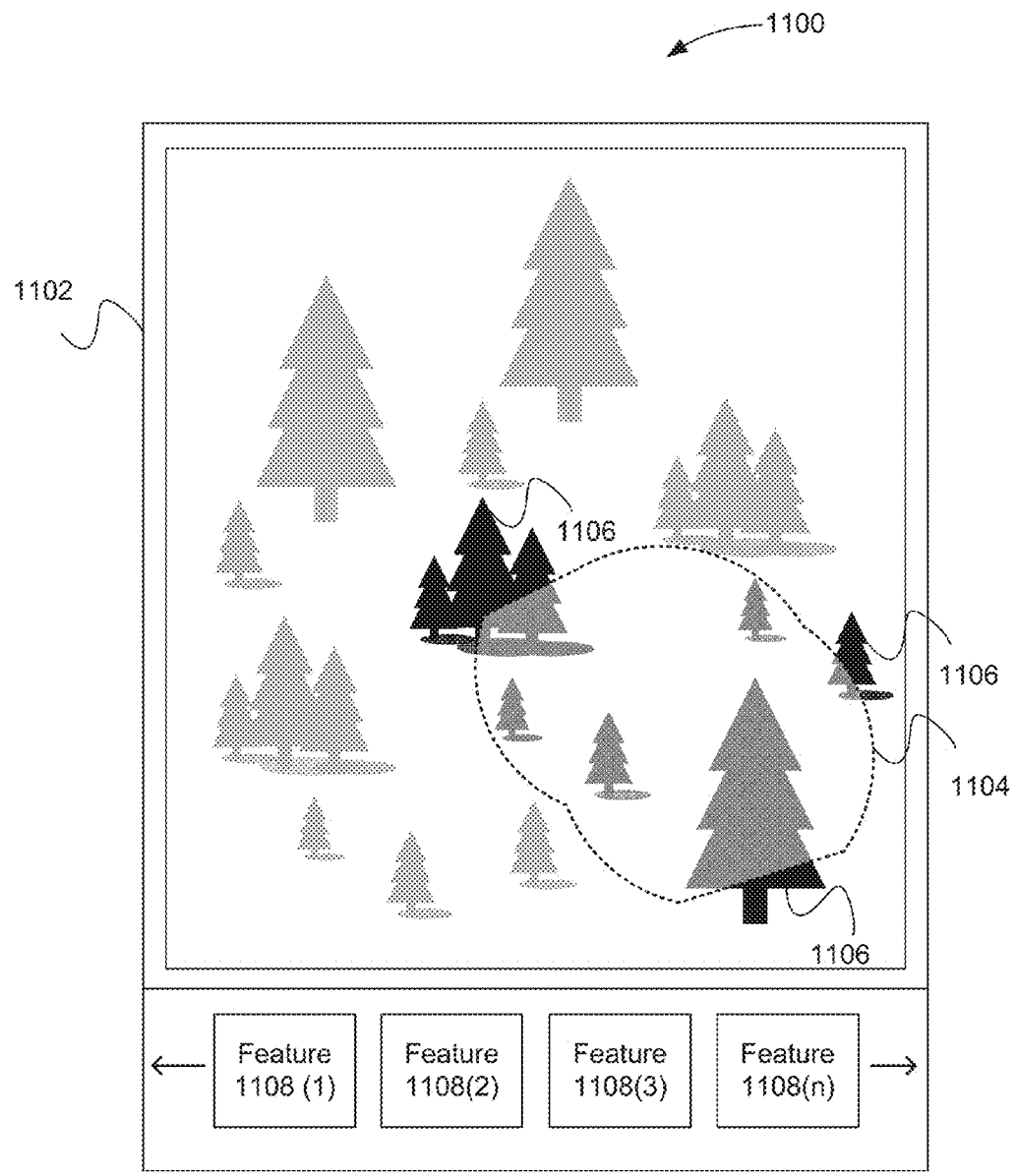
FIG. 11 illustrates a user interface for detecting one or more edges, in accordance with one possible embodiment.

FIG. 11 illustrates a user interface 1100 for detecting one or more edges, in accordance with one possible embodiment. As an option, the user interface 1100 may be implemented in the context of the details of any of the Figures. Of course, however, the user interface 1100 may be implemented in any desired environment. Further, the aforementioned definitions may equally apply to the description below.

As shown, user interface 1100 includes a display 1102, a first selection region 1104, a second selection region 1106, and one or more features 1108(1), 1108(2) . . . 1108(n).

In one embodiment, the first selection region 1104 may be inputted as a selection path. In one embodiment, the first selection region may be a region of contribution. In response to inputting the selection path, the area contained within the selection path may be included as a region of contribution. Additionally, in response to inputting the selection path, edge boundaries associated with any object within the first selection region 1104 may occur.

As shown, a second selection region 1106 may be selected based on the edge boundaries analyzed in response to the first selection region 1104. For example, in one embodiment, an initial path may include several tree objects selected in their entirety, as well as many other trees selected in part. The edge boundaries may detect areas associated with the objects (e.g. part of the trees, etc.) which are outside of the first selection region 1104. In this manner, the region of contribution may include objects selected by a selection path, as well as objects selected based on the edge boundary analysis.

In one embodiment, the one or more features 1108 may include any operation which may alter the region of contribution (e.g. copy, paste, saturation, exposure, etc.), consistent with that disclosed herein.

Figure 12:
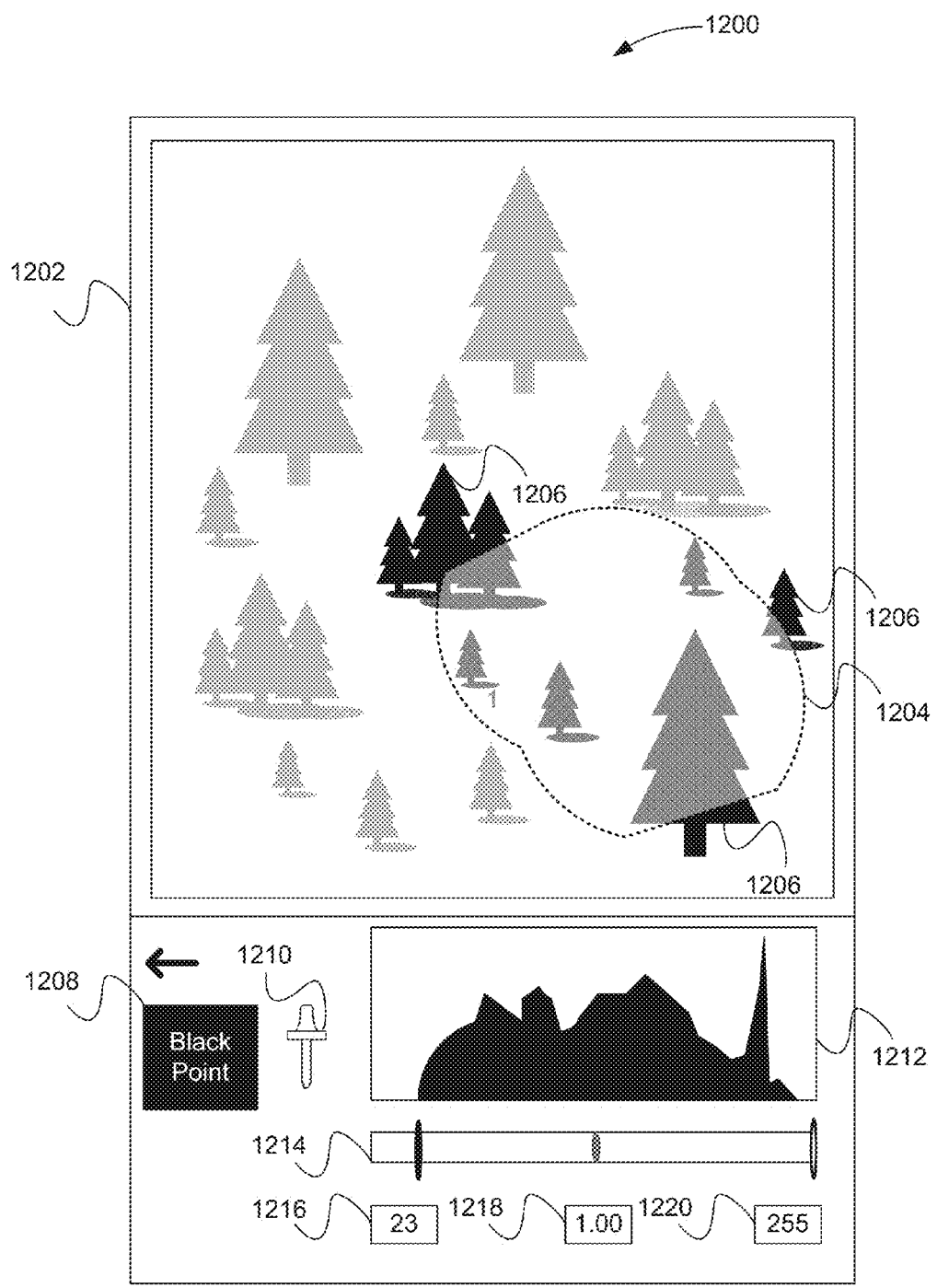
FIG. 12 illustrates a user interface for modifying a black point, in accordance with one possible embodiment.

FIG. 12 illustrates a user interface 1200 for modifying a black point, in accordance with one possible embodiment. As an option, the user interface 1200 may be implemented in the context of the details of any of the Figures. Of course, however, the user interface 1200 may be implemented in any desired environment. Further, the aforementioned definitions may equally apply to the description below.

As shown, user interface 1200 may include a display 1202, a first selection region 1204, a second selection region 1206, a first feature 1208, an eyedropper 1210, a histogram 1212, a slider 1214, a black point value 1216, a median point value 1218, and a white point value 1220. Items 1202, 1204, and 1206 may be described in a consistent manner as herein described for items 1102, 1104, and 1106 of FIG. 11.

In one embodiment, the first feature 1208 may be associated with a black point. In various embodiments, the black point may be set via an eyedropper (e.g. drag and drop eyedropper to a specific point and/or pixel on the display, etc.), via a selection (e.g. touch a point on the display, etc.), via a slider 1214, and/or via the black point value 1216. Additionally, changing the slider 1214 may automatically change the black point value 1216.

In various embodiments, histogram 1204 may correspond with the region of contribution, with the image, and/or with any other selection associated with the image. In one embodiment, the histogram may change based on the feature being applied (e.g. blending between two images, selection of a separate exposure for the selection, etc.).

Figure 13:
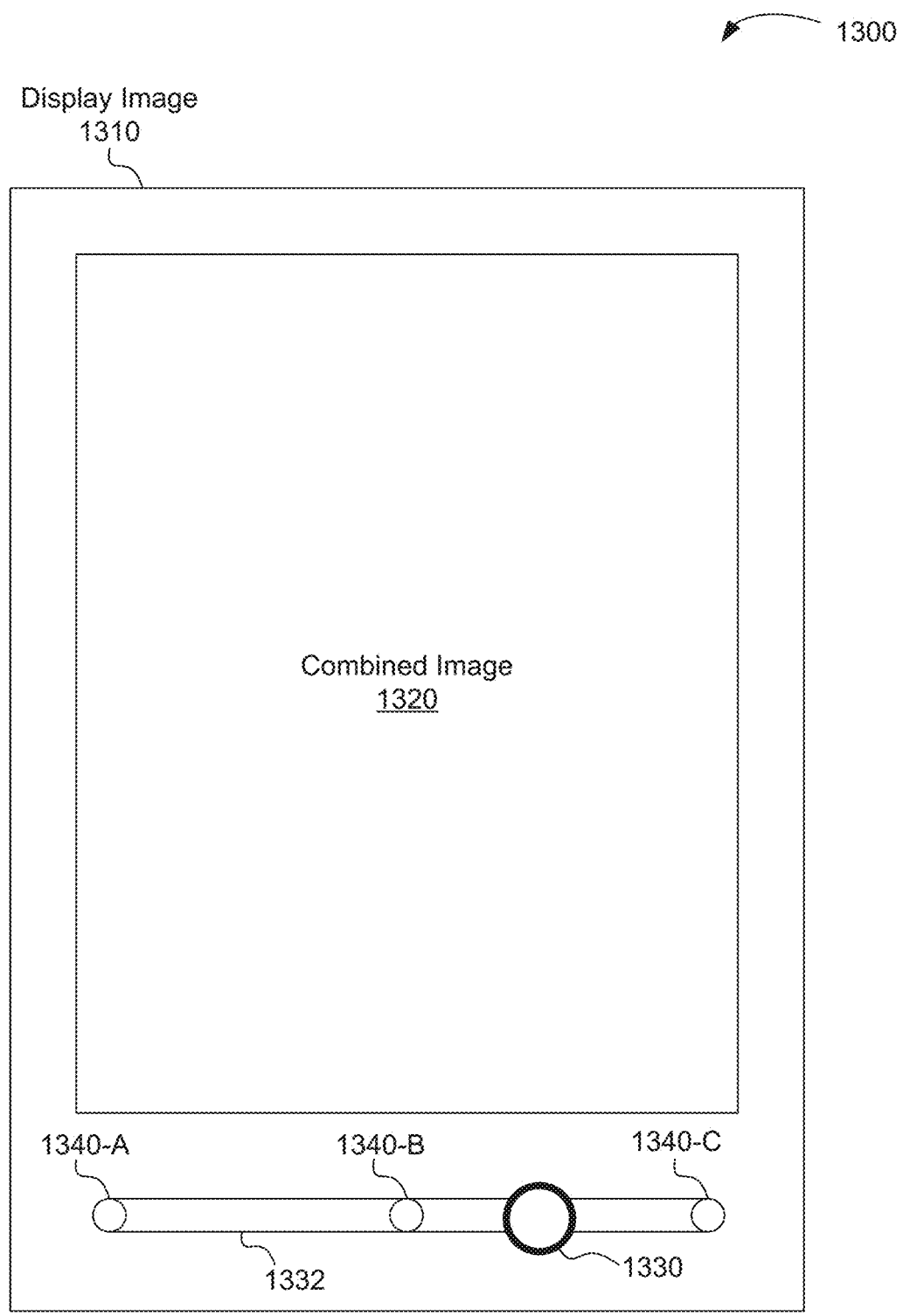
FIG. 13 illustrates a user interface (UI) system for generating a combined image, according to one embodiment.

FIG. 13 illustrates a user interface system 1300 for generating a combined image 1320, according to one embodiment. As an option, the UI system 1300 may be implemented in the context of the details of any of the Figures disclosed herein. Of course, however, the UI system 1300 may be implemented in any desired environment. Further, the aforementioned definitions may equally apply to the description below.

In one embodiment, a combined image 1320 comprises a combination of at least two related digital images. In one embodiment, the combined image 1320 comprises, without limitation, a combined rendering of a first digital image and a second digital image. In another embodiment, the digital images used to compute the combined image 1320 may be generated by amplifying an analog signal with at least two different gains, where the analog signal includes optical scene information captured based on an optical image focused on an image sensor. In yet another embodiment, the analog signal may be amplified using the at least two different gains on a pixel-by-pixel, line-by-line, or frame-by-frame basis.

In one embodiment, the UI system 1300 presents a display image 1310 that includes, without limitation, a combined image 1320, a slider control 1330 configured to move along track 1332, and two or more indication points 1340, which may each include a visual marker displayed within display image 1310.

In various embodiments, the user interface system 1300 may be used in combination with user interfaces 900, 1000, 1100, and/or 1200. For example, the user interface system may allow for manipulation of a feature and/or operation via slider control 1330.

In one embodiment, the UI system 1300 is generated by an adjustment tool executing within a processor complex 310 of a digital photographic system 300, and the display image 1310 is displayed on display unit 312. In one embodiment, at least two digital images, such as the at least two related digital images, comprise source images for generating the combined image 1320. The at least two digital images may reside within NV memory 316, volatile memory 318, memory subsystem 362, or any combination thereof. In another embodiment, the UI system 1300 is generated by an adjustment tool executing within a computer system, such as a laptop computer or a desktop computer. The at least two digital images may be transmitted to the computer system or may be generated by an attached camera device. In yet another embodiment, the UI system 1300 may be generated by a cloud-based server computer system, which may download the at least two digital images to a client browser, which may execute combining operations described below. In another embodiment, the UI system 1300 is generated by a cloud-based server computer system, which receives the at least two digital images from a digital photographic system in a mobile device, and which may execute the combining operations described below in conjunction with generating combined image 1320.

The slider control 1330 may be configured to move between two end points corresponding to indication points 1340-A and 1340-C. One or more indication points, such as indication point 1340-B may be positioned between the two end points. Each indication point 1340 may be associated with a specific version of combined image 1320, or a specific combination of the at least two digital images. For example, the indication point 1340-A may be associated with a first digital image generated utilizing a first gain, and the indication point 1340-C may be associated with a second digital image generated utilizing a second gain, where both of the first digital image and the second digital image are generated from a same analog signal of a single captured photographic scene. In one embodiment, when the slider control 1330 is positioned directly over the indication point 1340-A, only the first digital image may be displayed as the combined image 1320 in the display image 1310, and similarly when the slider control 1330 is positioned directly over the indication point 1340-C, only the second digital image may be displayed as the combined image 1320 in the display image 1310.

In one embodiment, indication point 1340-B may be associated with a blending of the first digital image and the second digital image. For example, when the slider control 1330 is positioned at the indication point 1340-B, the combined image 1320 may be a blend of the first digital image and the second digital image. In one embodiment, blending of the first digital image and the second digital image may comprise alpha blending, brightness blending, dynamic range blending, and/or tone mapping or other non-linear blending and mapping operations. In another embodiment, any blending of the first digital image and the second digital image may provide a new image that has a greater dynamic range or other visual characteristics that are different than either of the first image and the second image alone. Thus, a blending of the first digital image and the second digital image may provide a new computed HDR image that may be displayed as combined image 1320 or used to generate combined image 1320. To this end, a first digital signal and a second digital signal may be combined, resulting in at least a portion of a HDR image. Further, one of the first digital signal and the second digital signal may be further combined with at least a portion of another digital image or digital signal. In one embodiment, the other digital image may include another HDR image.

In one embodiment, when the slider control 1330 is positioned at the indication point 1340-A, the first digital image is displayed as the combined image 1320, and when the slider control 1330 is positioned at the indication point 1340-C, the second digital image is displayed as the combined image 1320; furthermore, when slider control 1330 is positioned at indication point 1340-B, a blended image is displayed as the combined image 1320. In such an embodiment, when the slider control 1330 is positioned between the indication point 1340-A and the indication point 1340-C, a mix (e.g. blend) weight may be calculated for the first digital image and the second digital image. For the first digital image, the mix weight may be calculated as having a value of 0.0 when the slider control 1330 is at indication point 1340-C and a value of 1.0 when slider control 1330 is at indication point 1340-A, with a range of mix weight values between 0.0 and 1.0 located between the indication points 1340-C and 1340-A, respectively. Referencing the mix operation instead to the second digital image, the mix weight may be calculated as having a value of 0.0 when the slider control 1330 is at indication point 1340-A and a value of 1.0 when slider control 1330 is at indication point 1340-C, with a range of mix weight values between 0.0 and 1.0 located between the indication points 1340-A and 1340-C, respectively.

A mix operation may be applied to the first digital image and the second digital image based upon at least one mix weight value associated with at least one of the first digital image and the second digital image. In one embodiment, a mix weight of 1.0 gives complete mix weight to the digital image associated with the 1.0 mix weight. In this way, a user may blend between the first digital image and the second digital image. To this end, a first digital signal and a second digital signal may be blended in response to user input. For example, sliding indicia may be displayed, and a first digital signal and a second digital signal may be blended in response to the sliding indicia being manipulated by a user.

This system of mix weights and mix operations provides a UI tool for viewing the first digital image, the second digital image, and a blended image as a gradual progression from the first digital image to the second digital image. In one embodiment, a user may save a combined image 1320 corresponding to an arbitrary position of the slider control 1330. The adjustment tool implementing the UI system 1300 may receive a command to save the combined image 1320 via any technically feasible gesture or technique. For example, the adjustment tool may be configured to save the combined image 1320 when a user gestures within the area occupied by combined image 1320. Alternatively, the adjustment tool may save the combined image 1320 when a user presses, but does not otherwise move the slider control 1330. In another implementation, the adjustment tool may save the combined image 1320 when a user gestures, such as by pressing a UI element (not shown), such as a save button, dedicated to receive a save command.

To this end, a slider control may be used to determine a contribution of two or more digital images to generate a final computed image, such as combined image 1320. Persons skilled in the art will recognize that the above system of mix weights and mix operations may be generalized to include two or more indication points, associated with two or more related images. Such related images may comprise, without limitation, any number of digital images that have been generated using a same analog signal to have different brightness values, which may have zero interframe time.

Furthermore, a different continuous position UI control, such as a rotating knob, may be implemented rather than the slider 1330 to provide mix weight input or color adjustment input from the user.

Figure 14:
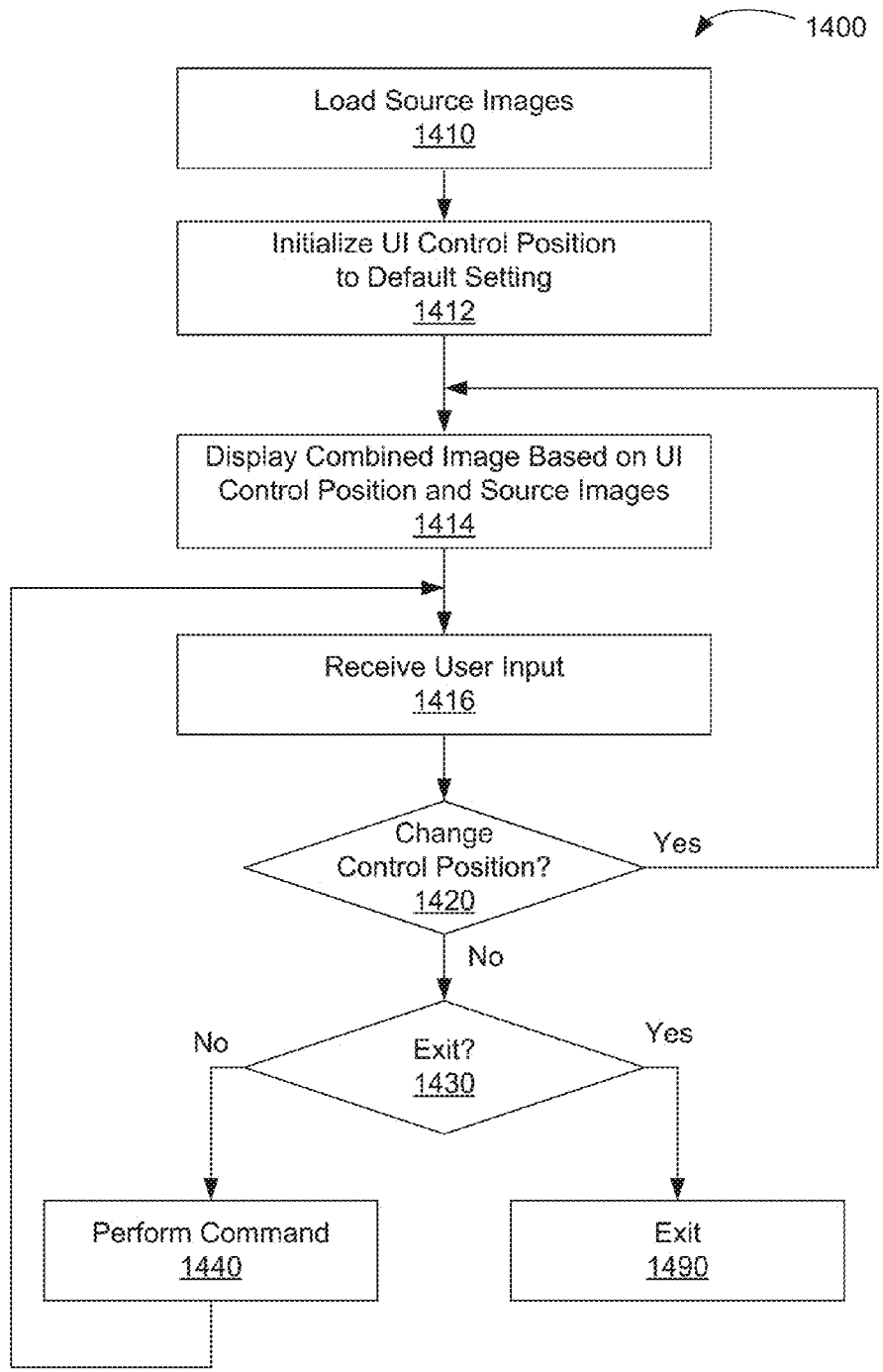
FIG. 14 is a method for generating a combined image, according to one embodiment.

FIG. 14 is a flow diagram of method 1400 for generating a combined image, according to one embodiment. As an option, the method 1400 may be carried out in the context of the details of any of the Figures disclosed herein. Of course, however, the method 1400 may be carried out in any desired environment. Further, the aforementioned definitions may equally apply to the description below.

The method 1400 begins in step 1410, where an adjustment tool executing within a processor complex, such as processor complex 310, loads at least two related source images, such as the first digital image and the second digital image described in the context of FIG. 13. In step 1412, the adjustment tool initializes a position for a UI control, such as slider control 1330 of FIG. 13, to a default setting. In one embodiment, the default setting comprises an end point, such as indication point 1340-A, for a range of values for the UI control. In another embodiment, the default setting comprises a calculated value based on one or more of the at least two related source images. In certain embodiments, the default setting is initialized to a value previously selected by a user in association with an image object comprising at least the first digital image and the second digital image.

In step 1414, the adjustment tool generates and displays a combined image, such as combined image 1320 of FIG. 13, based on a position of the UI control and the at least two related source images. In one embodiment, generating the combined image comprises mixing the at least two related source images as described previously in FIG. 13. In step 1416, the adjustment tool receives user input. The user input may include, without limitation, a UI gesture such as a selection gesture or click gesture within display image 1310. If, in step 1420, the user input should change the position of the UI control, then the adjustment tool changes the position of the UI control and the method proceeds back to step 1414. Otherwise, the method proceeds to step 1430.

If, in step 1430, the user input does not comprise a command to exit, then the method proceeds to step 1440, where the adjustment tool performs a command associated with the user input. In one embodiment, the command comprises a save command and the adjustment tool then saves the combined image, which is generated according to a position of the UI control. The method then proceeds back to step 1416.

Returning to step 1430, if the user input comprises a command to exit, then the method terminates in step 1490, where the adjustment tool exits, thereby terminating execution.

In summary, a technique is disclosed for receiving user interface input commands, the commands comprising a first input gesture in a first region of a display and a second input gesture in a second region of the display. The technique advantageously simplifies user input associated with selecting and operating on data objects.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   code for presenting a first presentation of a graphical user interface;
   code for receiving a first touch input in a first region of the graphical user interface, wherein the first region displays one or more image modifying tools, and the first touch input includes a selection of the one or more image modifying tools and is continuously received without interruption during a first time interval;
   code for, in response to receiving the first touch input, and while the first touch input is continuously received, activating the selected one or more image modifying tools;
   while the first touch input is continuously received, code for:
      while maintaining the presenting of the first presentation, receiving a second touch input that is a selection of one or more portions of a first image in a second region of the graphical user interface, wherein the second touch input is received during a second time interval;
      detecting a respective edge associated with each of the one or more portions of the first image based on the second touch input;
      determining whether a first edge of the one or more portions of the first image overlap with a second edge of the one or more portions of the first image;
      when it is determined that the first edge overlaps with the second edge, creating a union region based on a union function of the overlapped portion of the first edge and the second edge;
      combining the one or more portions of the first image based on at least one of the detection and the union region;
      refining the selection associated with the second touch input based on the combining; and
   code for performing one or more operations to a portion of the first image that corresponds to the refined selection, based on the first touch input and the second touch input.

2. The computer program product of claim 1, wherein the computer program product is operable such that the first region is predefined with set boundaries.

3. The computer program product of claim 1, wherein the computer program product is operable such that additional tools are capable of being displayed in the first region through at least one of a region depth or layer, screens associated with the region, or window frames of the region.

4. The computer program product of claim 1, wherein the computer program product is operable such that the second touch input is capable of including one or more points.

5. The computer program product of claim 4, wherein the computer program product is operable such that the one or more points include at least one of a range of data, an average of data, or a specific location on the graphical user interface.

6. The computer program product of claim 5, wherein the computer program product is operable such that the one or more points include the range of data, and the computer program product is further operable such that the range of data includes a range of pixels on the first image.

7. The computer program product of claim 6, wherein the computer program product is operable such that computing the one or more operations includes using the range of pixels on the first image, the range including an average of pixels.

8. The computer program product of claim 4, wherein the computer program product is operable such that the one or more points include a range of data, and the computer program product is further operable such that the range of data is based on the union region.

9. The computer program product of claim 6, wherein the computer program product is operable such that performing the one or more operations includes using the range of pixels on the first image, the range including histogram data.

10. The computer program product of claim 1, wherein the computer program product is operable such that the second touch input is capable of including two or more points, each of the points being associated with a specific one or more operations.

11. The computer program product of claim 1, wherein the computer program product is operable such that receiving the second touch input includes receiving multiple points in connection with the one or more portions of the first image.

12. The computer program product of claim 1, wherein the computer program product is operable such that the second touch input is capable of including the union function between two or more points displayed in the second region.

13. The computer program product of claim 1, wherein the computer program product is operable such that the second touch input is capable of including a contributing area for use in selecting a region based on one or more points of interest and the detected respective edge.

14. The computer program product of claim 1, wherein the computer program product is operable such that, in connection with the second touch input, the computer program product is operable for selecting an area of the second region, processing the selected area based on the detected respective edge, creating at least one ordered list for pixels selected, and displaying a resulting selected area; the performing one or more operations includes processing at least one vector to display a resulting image based on the one or more operations.

15. The computer program product of claim 1, wherein the computer program product is operable such that the first touch input is continuously received even after the second touch input has completed being received and the one or more operations are computed after the first touch input has completed being received.

16. The computer program product of claim 15, wherein the computer program product is operable such that after the second touch input has been received but while the first touch input is still being received, a third input is received via a gyroscope sensor in connection with one or more portions of the first image in a third region of the graphical user interface.

17. The computer program product of claim 16, wherein the computer program product is operable such that the one or more operations are computed based on the first touch input, the second touch input, and the third input.

18. The computer program product of claim 1, further comprising code for combining the one or more portions of the first image based on the detection.

19. The computer program product of claim 1, further comprising:
    code for selecting a union area based on the detection;
    code for combining the one or more portions of the first image based on the detection;
    code for creating a hue vector based on the combination; and
    code for updating the first image based on the hue vector.

20. The computer program product of claim 1, wherein the second touch input is received, at least in part, simultaneously with the first touch input.

21. An apparatus, comprising:
    circuitry for:
    presenting a first presentation of a graphical user interface;
    receiving a first touch input in a first region of the graphical user interface, wherein the first region displays one or more image modifying tools, and the first touch input includes a selection of the one or more image modifying tools and is continuously received without interruption during a first time interval;
    in response to receiving the first touch input, and while the first touch input is continuously received, activating the selected one or more image modifying tools;
    while the first touch input is continuously received:
      while maintaining the presenting of the first presentation, receiving a second touch input that is a selection of one or more portions of a first image in a second region of the graphical user interface, wherein the second touch input is received during a second time interval;
      detecting a respective edge associated with each of the one or more portions of the first image based on the second touch input;
      determining whether a first edge of the one or more portions of the first image overlap with a second edge of the one or more portions of the first image;
      when it is determined that the first edge overlaps with the second edge, creating a union region based on a union function of the overlapped portion of the first edge and the second edge;
      combining the one or more portions of the first image based on at least one of the detection and the union region;
      refining the selection associated with the second touch input based on the combining; and
    performing one or more operations to a portion of the first image that corresponds to the refined selection, based on the first touch input and the second touch input.

22. A method, comprising:
presenting a first presentation of a graphical user interface;
receiving a first touch input in a first region of the graphical user interface, wherein the first region displays one or more image modifying tools, and the first touch input includes a selection of the one or more image modifying tools and is continuously received without interruption during a first time interval;
in response to receiving the first touch input, and while the first touch input is continuously received, activating the selected one or more image modifying tools;
while the first touch input is continuously received:
while maintaining presenting of the first presentation, receiving a second touch input that is a selection of one or more portions of a first image in a second region of the graphical user interface, wherein the second touch input is received during a second time interval;
detecting a respective edge associated with each of the one or more portions of the first image based on the second touch input;
determining whether a first edge of the one or more portions of the first image overlap with a second edge of the one or more portions of the first image;
when it is determined that the first edge overlaps with the second edge, creating a union region based on a union function of the overlapped portion of the first edge and the second edge;
combining the one or more portions of the first image based on at least one of the detection and the union region;
refining the selection associated with the second touch input based on the combining; and
performing one or more operations to a portion of the first image that corresponds to the refined selection, based on the first touch input and the second touch input.

* * * * *